(12) United States Patent
Baghdasarian et al.

(10) Patent No.: US 8,915,474 B1
(45) Date of Patent: Dec. 23, 2014

(54) SOLAR PANEL SEQUENCING MECHANISM

(71) Applicant: Space Systems/Loral, Inc., Palo Alto, CA (US)

(72) Inventors: Varouj G. Baghdasarian, Cupertino, CA (US); Alan J. Szeto, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 320 days.

(21) Appl. No.: 13/624,410

(22) Filed: Sep. 21, 2012

(51) Int. Cl.
*B64G 1/22* (2006.01)

(52) U.S. Cl.
USPC ..................... 244/172.6; 52/173.3

(58) Field of Classification Search
USPC ........ 52/173.3; 244/172.6; 136/245, 246, 292
See application file for complete search history.

(56) References Cited

U.S. PATENT DOCUMENTS

| | | | |
|---|---|---|---|
| 5,520,747 A * | 5/1996 | Marks | 136/245 |
| 5,785,280 A * | 7/1998 | Baghdasarian | 244/172.6 |
| 5,909,860 A | 6/1999 | Lee | |
| 6,010,096 A | 1/2000 | Baghdasarian | |
| 6,119,986 A | 9/2000 | Stribling, Jr. | |
| 6,784,359 B2 | 8/2004 | Clark et al. | |
| 6,889,411 B2 | 5/2005 | Hinkley et al. | |
| 7,708,228 B2 | 5/2010 | Chaix et al. | |

OTHER PUBLICATIONS

Ding, Xilun et al., "Study on the Behavior of Solar Array Deployment with Root Hinge Drive Assembly," Chinese Journal of Aeronautics, 2012, No. 2, 276-284.

* cited by examiner

*Primary Examiner* — Jeanette E Chapman
*Assistant Examiner* — Daniel Kenny
(74) *Attorney, Agent, or Firm* — Weaver Austin Villeneuve & Sampson

(57) ABSTRACT

A deployable solar panel array featuring in-line solar panels and side solar panels, where the side solar panels are configured to deploy in a staggered fashion after deployment of the in-line panels. A passive deployment mechanism governs the deployment sequence.

18 Claims, 18 Drawing Sheets

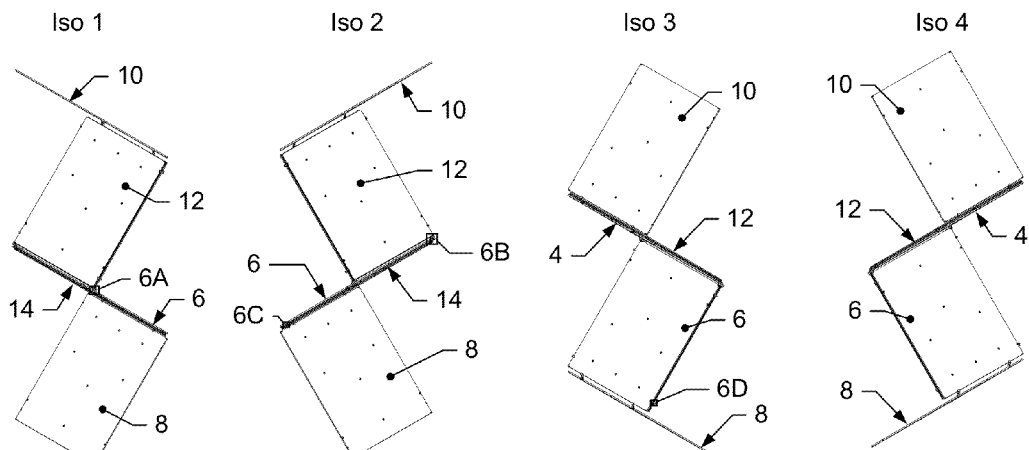
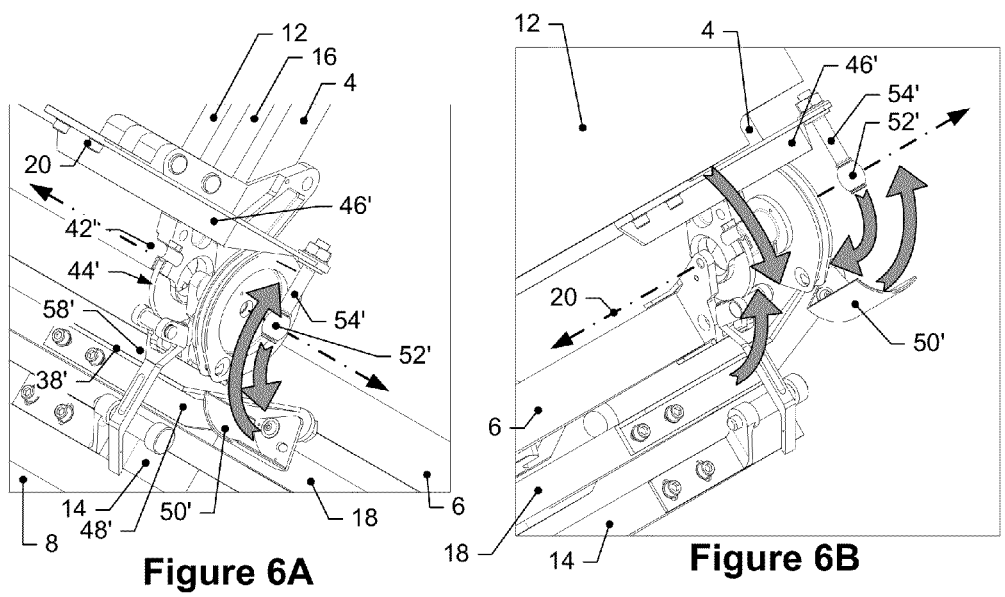

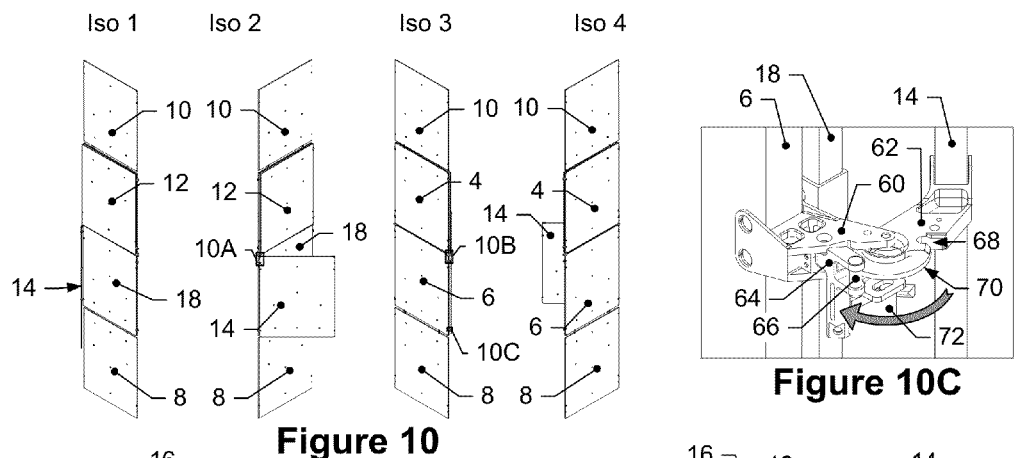
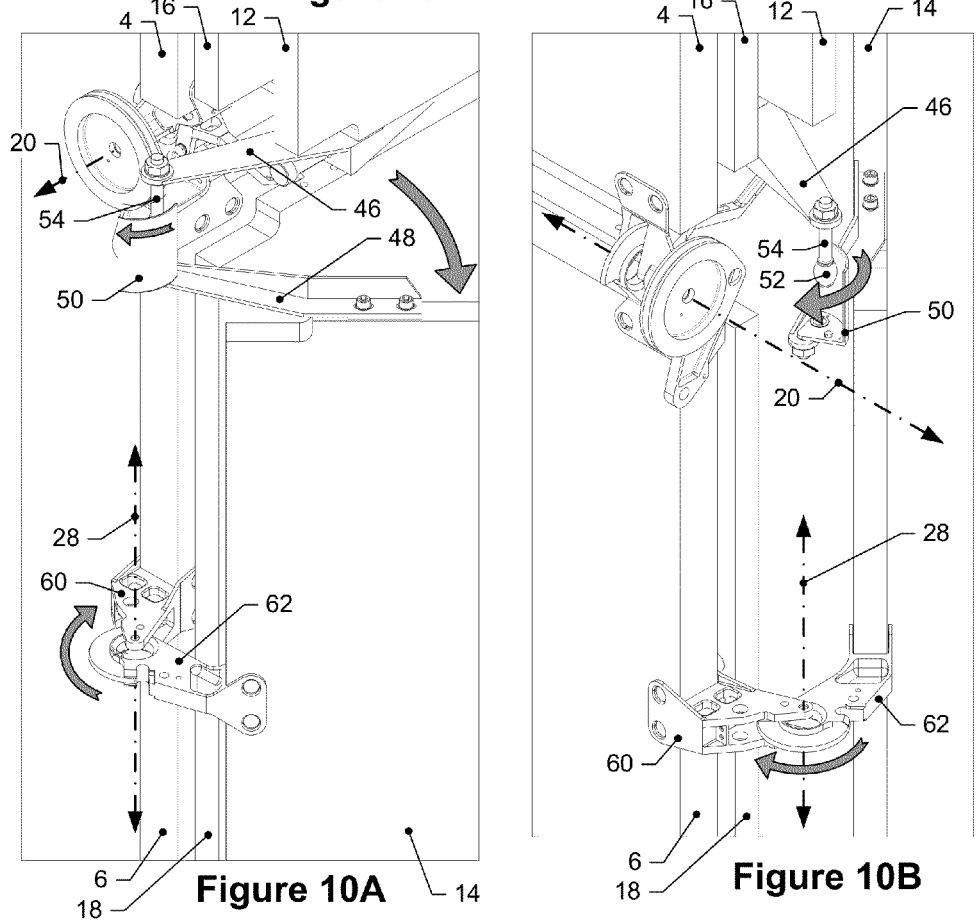
Figure 10
Figure 10C
Figure 10A
Figure 10B

SOLAR PANEL SEQUENCING MECHANISM

TECHNICAL FIELD

This invention relates generally to spacecraft featuring deployable solar panel arrays, and, more specifically, to spacecraft featuring deployable solar panel arrays including a sequencing mechanism for staggering the deployment of opposing side panels rotatably connected with adjacent in-line panels of a solar panel array.

BACKGROUND OF THE INVENTION

The assignee of the present invention manufactures and deploys spacecraft for, inter alia, communications and broadcast services. Market demands for such spacecraft have imposed increasingly stringent requirements on spacecraft payload operational capacity, and such requirements may consequently require increased power demands on the spacecraft. For spacecraft that produce power through photovoltaic systems, i.e., solar panel arrays, such increased power demand may be met by increasing the efficiency of the solar cells in the solar panel arrays or increasing the photovoltaic area of the solar panel arrays.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with the mass properties and fairing envelope constraints of such launch vehicles as, for example, Ariane V, Atlas XEPF, Proton, and Sea Launch. As such, solar panel arrays must be capable of being stowed in a launch configuration that is compatible with the launch vehicle, usually folded flat against a side of the spacecraft, and must then be capable of being deployed into an on-orbit operational configuration after the spacecraft reaches orbit. The major dimensions of a solar panel in such a solar panel array may thus be constrained in size so as to be approximately the same size as the panel of the spacecraft main body to which it attaches, e.g., in typical orbital spacecraft, the "north" and/or "south" panels (the panels of the main body facing the north/south directions, respectively, when the spacecraft is on-orbit). Since such solar panels are typically too small to satisfy the power requirements of many spacecraft, multiple instances of such solar panels are often connected together in a foldable array that is folded against a panel of the spacecraft body and that is configured to be transitioned into a deployed configuration once the spacecraft is on-orbit FIGS. 1A through 1C depict a style of solar panel array that features a one-dimensional array of solar panels. Each panel in such an array is connected with the adjacent panels by hinge interfaces on opposing sides of the panel. Through rotation of the panels about these hinge interfaces by 180 degrees in alternating directions, the panels may be extended in a concertinaed fashion from a stowed configuration, such as is shown in FIG. 1A, into the deployed configuration, such as is shown in FIG. 1C, along a deployment axis; such an array may be referred to as an in-line solar panel array. FIG. 1B shows the spacecraft of FIG. 1A midway through deployment of the in-line solar panel array.

While such an arrangement may, in theory, be used to supply an in-line solar panel array of any length, too great an increase in length results in an undesirable increase in the rotational moment of inertia of the spacecraft as each additional panel results in additional mass placed at further and further distances from the spacecraft main body.

FIG. 1D shows a schematic of another style of solar panel array that may include two additional solar panels connected to a common in-line panel in an in-line solar panel array. The additional solar panels, or "side" panels, may be connected to the common in-line panel along opposing free edges of the in-line panel using additional hinge interfaces. When fully deployed, such solar panel arrays may have a "T" or cruciform appearance, and may be referred to as cruciform solar arrays.

Cruciform solar panel arrays may feature a side panel restraint mechanism, such as is described in U.S. Pat. No. 6,010,096 to Varouj Baghdasarian, one of the present inventors. U.S. Pat. No. 6,010,096 is hereby incorporated by reference in its entirety. Such side panel restraint mechanisms may include a latch that restrains the side panels from rotational movement until the hinge that includes the side panel restraint mechanism has latched into a locked configuration. For example, a cruciform solar panel array may include a side panel restraint mechanism or mechanisms in the hinge interface or interfaces between the in-line panel to which the side panels are connected and an adjacent in-line panel. The side panel restraint mechanism may prevent substantial rotational movement of the side panels until after the in-line panels have locked into their deployed positions. One of the side panels may also feature a side panel restraint mechanism that prevents the other side panel from releasing until after the first side panel has locked into its deployed position; this prevents intra-side panel collisions. Such arrangements, however, are limited since the side panel restraint mechanisms and the side panels that they restrain must be connected to the same in-line panel. For example, cruciform panel arrangements may generally support only five or six solar panels.

For various reasons, such as design complexity and the likelihood of inter-panel collisions, spacecraft designers utilizing deployable rigid panel solar panel arrays have generally adopted either in-line solar panel arrays or cruciform solar panel arrays for use with spacecraft. With the increasing power needs of spacecraft, however, there is a need for larger sizes of solar panel arrays that in-line and cruciform solar panel arrays may not be capable of providing.

SUMMARY OF INVENTION

The systems, methods and devices of the disclosure each have several innovative aspects, no single one of which is solely responsible for the desirable attributes disclosed herein. One innovative aspect of the subject matter described in this disclosure can be implemented in a variety of ways.

The present inventors have appreciated that an array of rigid solar panels with at least two in-line panels and two side panels, each connected with a different one of the two in-line panels along opposite sides of the in-line panels, may be used to provide a deployable solar panel array. The present inventors have further realized that a sequencing mechanism may be used with such an array to prevent inter-panel collisions during deployment of the solar panels. The present inventors have also realized that such a solar panel array may be implemented using additional side or in-line panels, e.g., to provide an eight-panel deployable array.

In some implementations, a deployment apparatus for a multi-paneled solar array is provided. The deployment apparatus may include, for example, first and second in-line panels pivotally connected together about a first in-line hinge axis for rotation between stowed and deployed positions. The deployment apparatus may also include a first side panel pivotally connected to the first in-line panel about a first side hinge axis transverse to the first in-line hinge axis for rotation between the stowed and the deployed positions, as well as a second side panel pivotally connected to the second in-line panel about a second side hinge axis transverse to the first in-line hinge axis for rotation between the stowed and the deployed positions, the second side hinge axis located opposite the first side hinge axis with respect to the first and second in-line panels. The deployment mechanism may also include a first drive mechanism configured to passively move the first and second in-line panels from the stowed position to the deployed position, as well as a first restraint mechanism configured to substantially restrain the second side panel with respect to the second in-line panel and to release the second side panel after the first drive mechanism has begun to move the first and second in-line panels into the deployed positions. The deployment apparatus may also include a second drive mechanism configured to passively rotate the second side panel about the second side hinge axis, and a second restraint mechanism configured to substantially restrain the first side panel with respect to the first in-line panel and to release the first side panel for rotation about the first side hinge axis after the second side panel has rotated clear of the swept extended volume of the first side panel.

In some implementations, the second restraint mechanism may be further configured to not restrain the first side panel with respect to the first in-line panel when the in-line panels are in the stowed position and to enter into a configuration that restrains the first side panel with respect to the first in-line panel while the first in-line panel and the second in-line panel are transitioning from the stowed position to the deployed position.

Some further implementations of the deployment apparatus may also include a third side panel pivotally connected to the first in-line panel about a third side hinge axis transverse to the first in-line hinge axis for rotation between the stowed and the deployed positions, the third side hinge axis located opposite the first side hinge axis with respect to the first in-line panel, as well as a fourth side panel pivotally connected to the second in-line panel about a fourth side hinge axis transverse to the first in-line hinge axis for rotation between the stowed and the deployed positions, the fourth side hinge axis located opposite the second side hinge axis with respect to the second in-line panel. Such further implementations may also include a third restraint mechanism configured to substantially restrain the third side panel with respect to the first in-line panel and to release the third side panel for rotation about the third side hinge axis after the first side panel has fully deployed, as well as a fourth restraint mechanism configured to substantially restrain the fourth side panel with respect to the second in-line panel and to release the fourth side panel for rotation about the fourth side hinge axis after the third side panel has rotated clear of the swept extended volume of the fourth side panel.

In some implementations, the deployment apparatus may further include a third in-line panel pivotally connected to the second in-line panel about a second in-line hinge axis parallel to and opposite the first in-line hinge axis for rotation between the stowed and the deployed positions, as well as a fourth in-line panel pivotally connected to the first in-line panel about a third in-line hinge axis parallel to and opposite the first in-line hinge axis for rotation between the stowed and the deployed positions. In such implementations, the first drive mechanism may be further configured to passively move the third and fourth in-line panels from the stowed position to the deployed position, or may be part of a larger mechanism that is configured to do so.

In some implementations, the second restraint mechanism may include a restraint surface, the restraint surface fixed in space with respect to the second side panel, and a roller, the roller translationally fixed in space with respect to the first side panel, wherein the roller and the restraint surface are positioned such that when the first in-line panel and the second in-line panel are in the deployed position, the restraint surface overlaps the roller in a direction paralleling the second side hinge axis.

In some further implementations, the second restraint mechanism may further include a post that supports the roller. The post may be affixed to a support bracket affixed to the first side panel. In such implementations, the restraint surface may face one side of the post when the first in-line panel and the second in-line panel are in the stowed position, and may face an opposite side of the post when the first in-line panel and the second in-line panel are in the deployed position.

In some further implementations, a reference line that is orthogonal to the first in-line hinge axis and that passes through the roller may intersect the restraint surface when the first in-line panel and the second in-line panel are in the stowed position as well as when the first in-line panel and the second in-line panel are in the deployed position.

In some implementations, the roller may be located closer to the first in-line hinge axis than the restraint surface when the first in-line panel and the second in-line panel are in the stowed position.

In some implementations, the rotational relative positioning of the restraint surface with respect to the second side panel about the revolute axis may be adjustable via an adjustment screw.

In some implementations, the restraint surface may be defined by a partial surface of revolution about a revolute axis substantially coaxial with the second side hinge axis. In some such implementations, the partial surface of revolution may have a revolution angle corresponding to the amount of rotation about the second side hinge axis that the second side panel must undergo to be clear of the swept extended volume of the first side panel.

In some implementations, the first restraint mechanism may be part of a first in-line hinge interface. The first in-line hinge interface may include a base portion, a bracket portion, and a cam follower. The bracket portion may include a cam surface about the first in-line hinge axis and the base portion and the bracket portion may be configured to rotate with respect to each other about the first in-line hinge axis between a closed position and an open position. The cam follower may be pivotally mounted to the base portion and sprung so as to be forced into rolling or sliding contact with the cam surface when the bracket portion and the base portion are in the closed position and while the bracket portion and the base portion are transitioned from the closed position to the open position. The cam surface may terminate in a locking recess that is configured to receive the cam follower when the bracket portion and the base portion are transitioned into the open position, thereby preventing further rotational movement of the bracket portion and the base portion with respect to each other.

In some such implementations, the locking recess may be located approximately 180 degrees about the in-line hinge axis from the cam follower when the bracket portion and the base portion are in the closed position.

In some such implementations, the first in-line hinge interface further includes a bias mechanism configured to rotate the bracket portion and the base portion into the open position.

In some implementations, a deployment apparatus for a multi-paneled solar array is provided. The deployment apparatus may include first and second in-line panels pivotally connected together about a first in-line hinge axis for rotation between stowed and deployed positions, as well as a first side panel pivotally connected to the first in-line panel about a first side hinge axis transverse to the first in-line hinge axis for rotation between the stowed and the deployed positions and a second side panel pivotally connected to the second in-line panel about a second side hinge axis transverse to the first in-line hinge axis for rotation between the stowed and the deployed positions. The second side hinge axis may be located opposite the first side hinge axis with respect to the first and second in-line panels. The first in-line panel, the second in-line panel, the first side panel, and the second side panel may all be substantially the same size, and, in the stowed position, the first in-line panel, the second in-line panel, the first side panel, and the second side panel may be in an interleaved, stacked arrangement. In the deployed position, the first in-line panel, the second in-line panel, the first side panel, and the second side panel may all be substantially co-planar with each other, the first in-line panel and the second in-line panel may be separated by a first gap, the first in-line panel and the first side panel may be separated by a second gap, and the second in-line panel and the second side panel may be separated by a third gap. The first gap, the second gap, and the third gap are all substantially the same size.

In some further implementations, the first gap, the second gap, and the third gap may be sized such that stay-out zones of the first side panel and the second side panel intersect when the first in-line panel and the second in-line panel are at approximately 2 degrees of misalignment from their relative positions in the deployed position. The stay-out zones of the first side panel and the second side panel may be defined with respect to the rotations of the first side panel and the second side panel, respectively.

In some further implementations, the deployment apparatus may be configured to release the first side panel and the second side panel after the first in-line panel and the second in-line panel are in the deployed position, and to release the first side panel and the second side panel in a staggered fashion. In such implementations, the side panel of the first side panel and the second side panel that is released second may be released only after the side panel that is released first has cleared a stay-out zone of the side panel that is released second, and the stay-out zone may be defined with respect to the rotation of the side panel that is released second.

In some further implementations, the deployment apparatus may further include a third side panel pivotally connected to the first in-line panel about a third side hinge axis opposite the first side hinge axis and transverse to the first in-line hinge axis for rotation between the stowed and the deployed positions, as well as a fourth side panel pivotally connected to the second in-line panel about a fourth side hinge axis opposite the second side hinge axis and transverse to the first in-line hinge axis for rotation between the stowed and the deployed positions. In such implementations, the first in-line panel, the second in-line panel, the first side panel, the second side panel, the third side panel, and the fourth side panel may all be substantially the same size, and, in the stowed position, the first in-line panel, the second in-line panel, the first side panel, the second side panel, the third side panel, and the fourth side panel may be in an interleaved, stacked arrangement. Furthermore, in the deployed position for such implementations, the first in-line panel, the second in-line panel, the first side panel, the second side panel, the third side panel, and the fourth side panel may all be substantially co-planar with each other, the first in-line panel and the third side panel may be separated by a fourth gap, and the second in-line panel and the fourth side panel may be separated by a fifth gap. The first gap, the second gap, the third gap, the fourth gap, and the fifth gap may all be substantially the same size.

In some further implementations, the deployment apparatus may be configured to release the third side panel after the first side panel is in the deployed position, release the fourth side panel after the second side panel is in the deployed position, and release the third side panel and the fourth side panel in a staggered fashion. In such implementations, the side panel of the third side panel and the fourth side panel that is released second is released only after the side panel of the third side panel and the fourth side panel that is released first has cleared an additional stay-out zone of the side panel that is released second of the third side panel and the fourth side panel. The additional stay-out zone may be defined with respect to the rotation of the side panel of the third side panel and the fourth side panel that is released second.

In some further implementations, the deployment apparatus may include a third in-line panel pivotally connected to the second in-line panel about a second in-line hinge axis parallel to and opposite the first in-line hinge axis for rotation between the stowed and the deployed positions, as well as a fourth in-line panel pivotally connected to the first in-line panel about a third in-line hinge axis parallel to and opposite the first in-line hinge axis for rotation between the stowed and the deployed positions. In such implementations, the first in-line panel, the second in-line panel, the third in-line panel, the fourth in-line panel, the first side panel, the second side panel, the third side panel, and the fourth side panel may all be substantially the same size, and, in the stowed position, the first in-line panel, the second in-line panel, the third in-line panel, the fourth in-line panel, the first side panel, the second side panel, the third side panel, and the fourth side panel may be in an interleaved, stacked arrangement. Furthermore, in the deployed position, the first in-line panel, the second in-line panel, the third in-line panel, the fourth in-line panel, the first side panel, the second side panel, the third side panel, and the fourth side panel may all be substantially co-planar with each other, the first in-line panel and the third side panel may be separated by a fourth gap, the second in-line panel and the fourth side panel may be separated by a fifth gap, the first in-line panel and the fourth in-line panel may be separated by a sixth gap, and the second in-line panel and the third in-line panel may be separated by a seventh gap. The first gap, the second gap, the third gap, the fourth gap, the fifth gap, the sixth gap, and the seventh gap may all be substantially the same size.

Details of one or more implementations of the subject matter described in this specification are set forth in the accompanying drawings and the description below. Other features, aspects, and advantages will become apparent from the description, the drawings, and the claims. Note that the relative dimensions of the following figures, unless otherwise noted, may not be drawn to scale.

BRIEF DESCRIPTION OF THE DRAWINGS

FIGS. 5, 6, 7, 8, 9, 10, 11, 12, 13, 14, 15, 16, 17, 18, and 19 all depict the same 8-panel solar panel array during various stages of deployment. Each such figure depicts the solar panel array from each of four isometric perspectives. Each isometric perspective is labeled "Iso" followed by an index number.

FIG. 3 is not to-scale.

FIG. 5 depicts the solar panel array in a stowed configuration.

FIG. 6 depicts the solar panel array with the in-line panels approximately 50% extended.

FIG. 6A depicts a detail view of the solar panel array of FIG. 6 corresponding with the region marked 6A in FIG. 6.

FIG. 6B depicts a detail view of the solar panel array of FIG. 6 corresponding with the region marked 6B in FIG. 6.

FIG. 7 depicts the solar panel array with the in-line panels nearly completely deployed.

FIG. 8 depicts the solar panel array with the in-line panels fully deployed.

FIG. 9 depicts the solar panel array with the in-line panels fully deployed and with one of the side panels partially deployed.

FIG. 10 depicts the solar panel array with the in-line panels fully deployed and with one of the side panels partially deployed.

FIG. 10A depicts a detail view of the solar panel array of FIG. 10 corresponding with the region marked 10A in FIG. 10.

FIG. 10B depicts a detail view of the solar panel array of FIG. 10 corresponding with the region marked 10B in FIG. 10.

FIG. 10C depicts a detail view of the solar panel array of FIG. 10 corresponding with the region marked 10C in FIG. 10.

FIG. 11 depicts the solar panel array with the in-line panels fully deployed and with two of the side panels partially deployed.

FIG. 12 depicts the solar panel array with the in-line panels fully deployed and with two of the side panels further partially deployed.

FIG. 13 depicts the solar panel array with the in-line panels and one side panel fully deployed.

FIG. 14 depicts the solar panel array with the in-line panels and one side panel fully deployed and with two of the side panels partially deployed.

FIG. 15 depicts the solar panel array with the in-line panels and two side panels fully deployed.

FIG. 16 depicts the solar panel array with the in-line panels and two side panels fully deployed and two side panels partially deployed.

FIG. 17 depicts the solar panel array with the in-line panels and three side panels fully deployed and the remaining side panel partially deployed.

FIG. 18 depicts the solar panel array with the in-line panels and three side panels fully deployed and the remaining side panel partially deployed.

FIG. 19 depicts the solar panel array with the in-line panels and the side panels fully deployed.

It is to be understood that FIGS. 5 through 19, including any detail views referencing such Figures, are each drawn to scale, although the scale may vary from Figure to Figure.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to or with another element, it can be directly connected or coupled to or with the other element, or intervening elements may be present. Furthermore, "connected" or "coupled" as used herein in an electrical context may include wirelessly connected or coupled. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system. Additionally, the terms "solar panel array," "solar array," and "panel array" may be used interchangeably herein, and generally refer to an array of photovoltaic panels. Furthermore, the terms "solar panel," "photovoltaic panel," and "panel" may be used interchangeably herein, and generally refer to a photovoltaic panel. Such photovoltaic panels may include a number of photovoltaic cells that are all mounted to a common frame or substrate, and that move together as a unit during solar panel array deployment. The systems described herein are intended for use with "rigid" solar panels, i.e., solar panels that have a substantially rigid overall shape (as opposed, for example, to thin-film solar panels, which may be rolled up, much like a roll of paper, or folded, much like folding a piece of paper). It is to be understood that a "non-rigid" solar panels may be transformed into rigid solar panels if mounted to an appropriately stiff framework or substrate, and that such implementations would thus be considered to still fall within the scope of the rigid solar panels discussed herein. Accordingly, it is to be understood that a photovoltaic panel, as used herein, refers to a rigid solar panel.

This disclosure may also refer to solar panels as being "substantially the same size." It is to be understood that this does not require that solar panels be identically sized. Instead, it is to be understood that solar panels that are substantially the same size may differ in thickness, overall dimensions, and in detail features—however, such solar panels would, when viewed from a distance, all appear to be the same size.

Figure 1A:
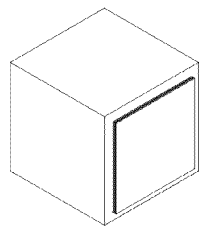
FIG. 1A depicts a schematic diagram of a spacecraft with extensible in-line solar panel arrays in the stowed position.
Figure 1B:
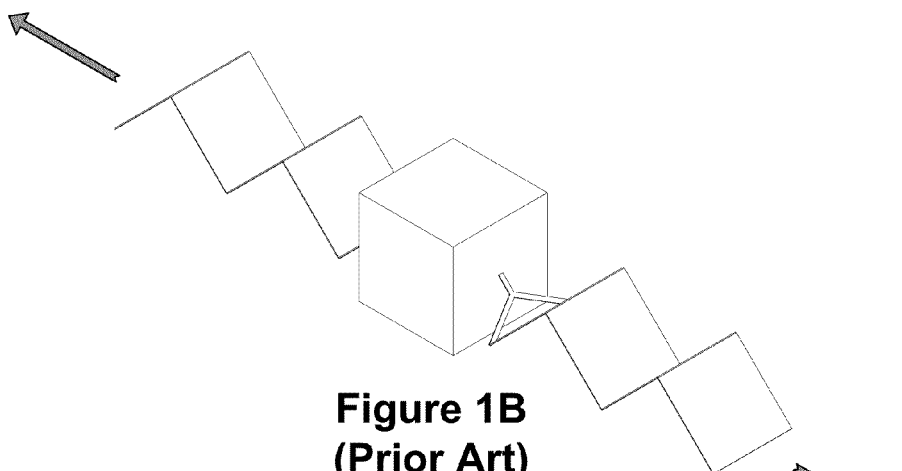
FIG. 1B shows the spacecraft of FIG. 1A midway through deployment of the in-line solar panel array.
Figure 1C:
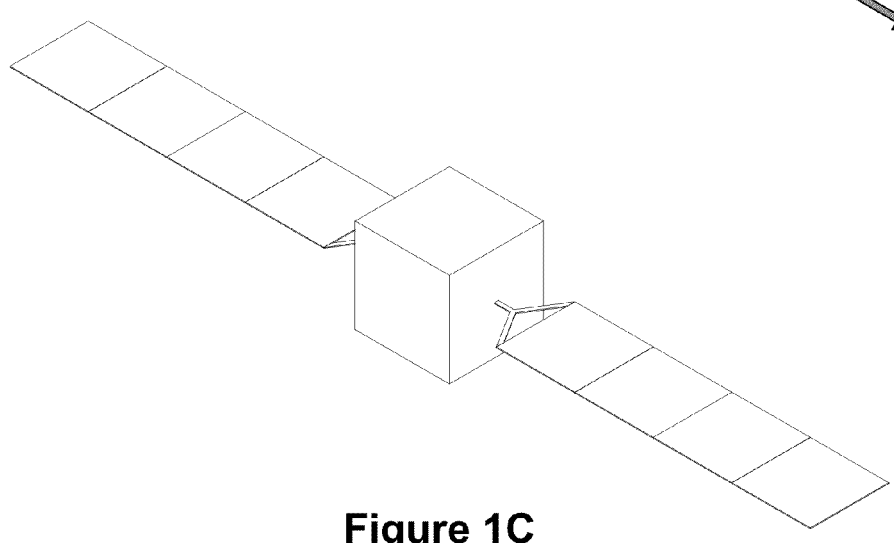
FIG. 1C shows the spacecraft of FIG. 1A with the in-line solar panel array fully deployed.
Figure 1D:
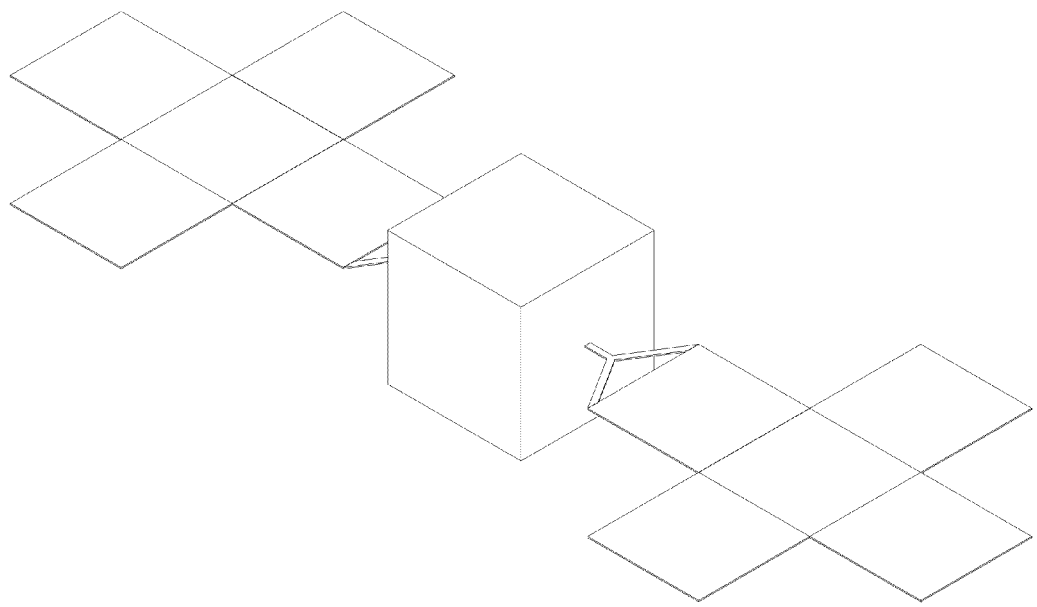
FIG. 1D depicts a schematic of a fully-deployed cruciform-type solar panel array.
Figure 2:
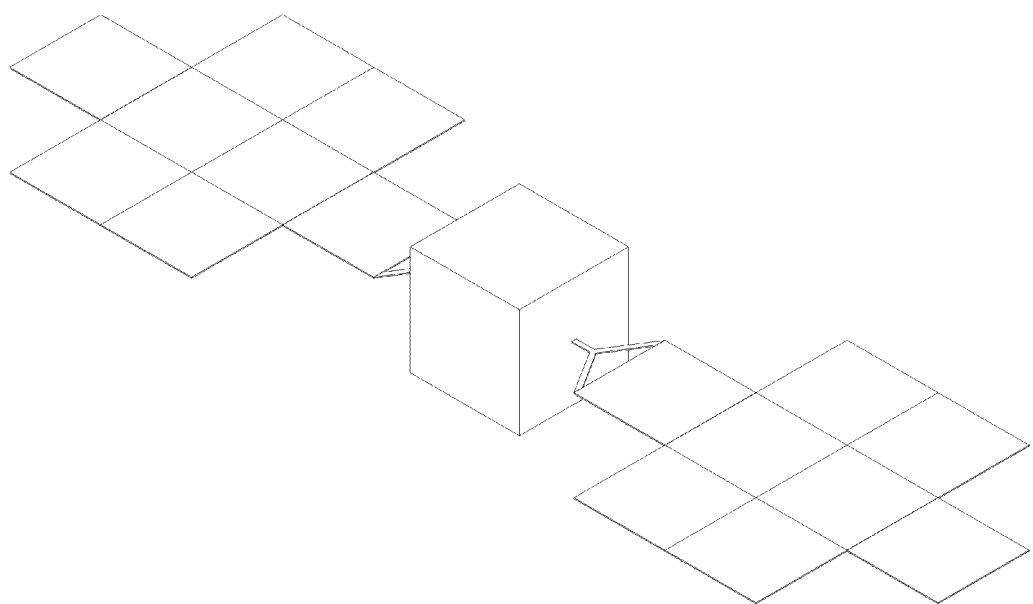
FIG. 2 depicts a schematic of a fully-deployed eight-panel solar panel array.
Figure 3:
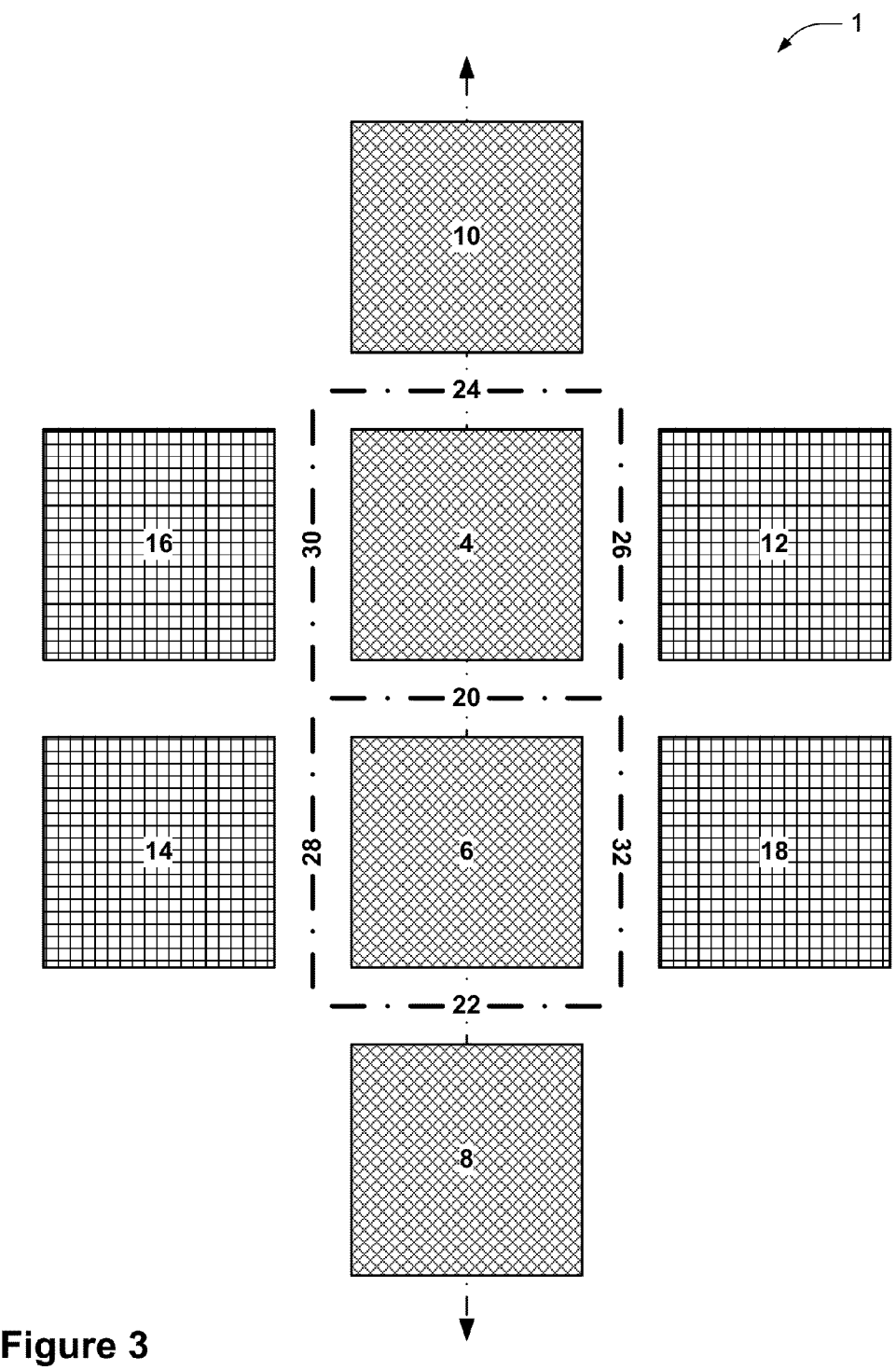
FIG. 3 depicts a high-level diagram showing the eight-panel solar array and identifying hinge axes joining each adjacent in-line panel and each side panel to an adjacent in-line panel.

The inventors have developed an eight-panel solar panel array sequencing mechanism that enables a deployed panel configuration as shown in FIG. 2. FIG. 3 depicts a high-level diagram showing an eight-panel solar array and identifying hinge axes joining each adjacent in-line panel and each side panel to an adjacent in-line panel. The solar panel array shown in FIG. 2 and FIG. 3 is shown in the deployed state. For discussion purposes, an eight-panel solar panel array similar to the solar panel array 1 as shown in FIG. 3 will also be used as an example implementation throughout this disclosure. However, it is to be understood that various aspects of the example implementation may be equally applicable to implementations featuring more or less solar panels. For example, the sequencing mechanism discussed herein may be used in a solar panel array featuring two in-line panels and two side panels, each connected to different in-line panel along opposing sides of the in-line panels parallel to the in-line panel extension axis (forming a "z" shape when deployed). Similarly, the sequencing mechanism discussed herein may be used with six panel arrays (forming a 2×3 rectangular array), or in arrays with more than eight panels.

In FIG. 3, a first in-line panel 4 and a second in-line panel 6 may be connected together via a first in-line hinge interface (not shown) with a first in-line hinge axis 20. A third in-line panel 8 may be connected to the second in-line panel 6 by a second in-line hinge interface (not shown) with a second in-line hinge axis 22. Similarly, a fourth in-line panel 10 may be connected to the first in-line panel 4 by a third in-line hinge interface (not shown) with a third in-line hinge axis 24. The second and third in-line hinge interfaces may be configured to allow for rotations in a direction opposite the direction that the first in-line hinge interface is configured to allow.

Also visible in FIG. 3 are a first side panel 12, a second side panel 14, a third side panel 16, and a fourth side panel 18. The first side panel 12 and the third side panel 16 may be connected to opposing sides of the first in-line panel 4 by a first side hinge interface (not shown) with a first side hinge axis 26 and a third side hinge interface (not shown) with a third side hinge axis 30. Similarly, the second side panel 14 and the fourth side panel 18 may be connected to opposing sides of the second in-line panel 6 by a second side hinge interface (not shown) with a second side hinge axis 28 and a fourth side hinge interface (not shown) with a fourth side hinge axis 32. The second side hinge axis 28 and the third side hinge axis 30 may be substantially coaxial with each other when the solar panel array is fully deployed, and the first side hinge axis 26 and the fourth side hinge axis 32 may also be substantially coaxial with each other when the solar panel array is fully deployed.

Figure 4A:
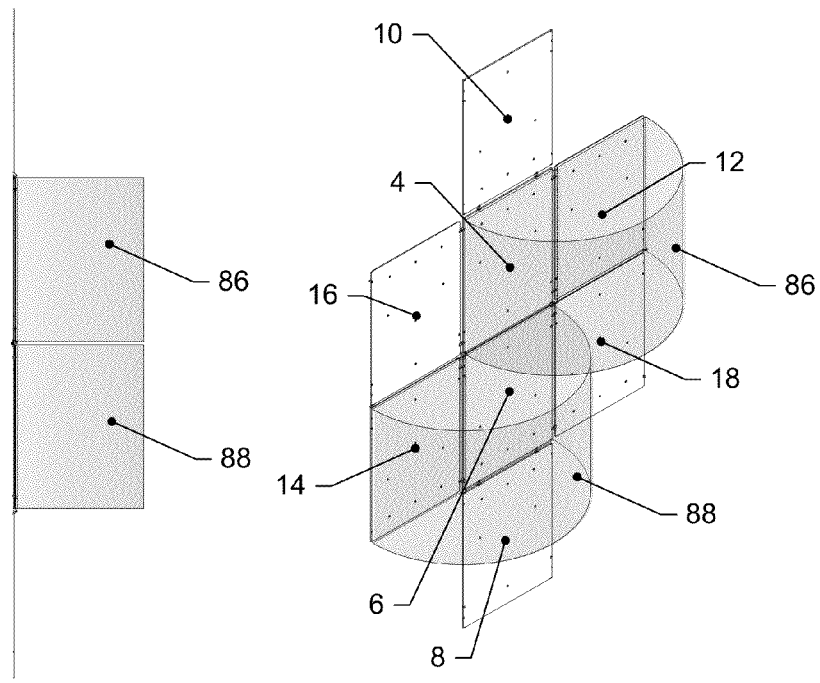
FIG. 4A depicts side and isometric views of the solar panel array in a fully deployed, aligned state, as well as swept volumes of two of the side panels.

FIG. 4A depicts side and isometric views of the solar panel array in a fully deployed, aligned state, as well as swept volumes of two of the side panels. The swept volumes shown, in this case, are for the first side panel 12 (first swept volume 86) and the second side panel 14 (second swept volume 88), although other swept volumes, of course, exist for each of the other panels as well. As can be seen in the side view shown in FIG. 4A, the first swept volume 86 and the second swept volume 88 do not intersect when the solar panel array is in its fully-deployed state.

The term "swept volume" is used herein to refer to the reference volume through which a part capable of rotation may travel when rotated through its full range of motion. The term "swept area" may also be used to refer to the same concept. For a substantially rectangular solar panel connected to a hinge that allows 180 degrees of rotation, the swept volume of the solar panel may be generally defined by a cylinder halved along its center axis, where the center axis is coincident with the hinge axis.

Potential intersections of swept volumes for the side panels are of interest because they may represent an increased risk of inter-panel collision during deployment. For example, if one side panel's swept volume intersects another side panel's swept volume for some reason, the intersection of the two volumes may represent a zone where there is a heightened risk of inter-panel collisions if both panels are within the intersection zone simultaneously.

In the spacecraft industry, it is common to use the term "stay-out zone" to represent a reference volume for a component that other components should "stay out of" during some timeframe, generally in order to prevent collision of the component with the other components. Stay-out zones for rotating components during rotation may, for example, be largely defined by the swept volume of the component during rotational movement. However, the stay-out zone for a rotating component may be larger than the actual swept volume to accommodate potential variation in the rotational movement of the component. For example, the stay-out zone may be larger than the swept volume to accommodate flexure in the rotated component, misalignment of the rotated component hinge axis with respect to other components, etc.

Figure 4B:
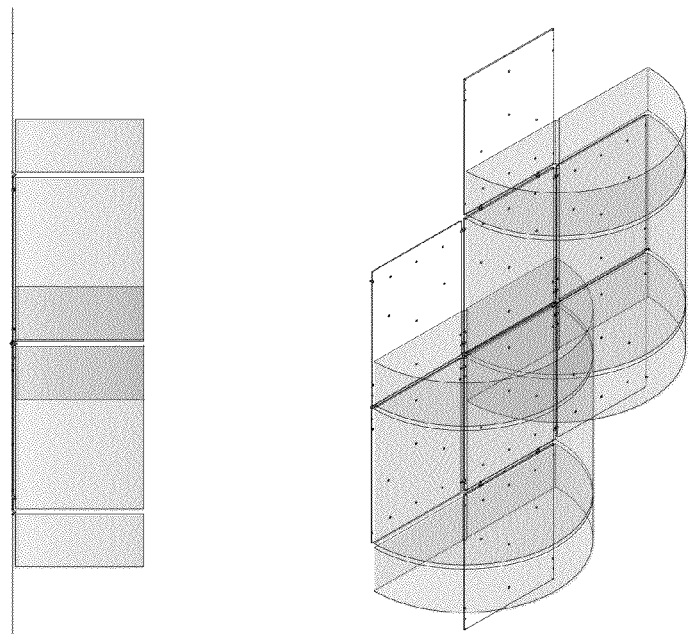
FIG. 4B depicts side and isometric views of the solar panel array in a fully deployed, aligned state, as well as swept extended volumes of two of the side panels.

While the definition of stay-out zones may be somewhat complex, such zones are well understood in the industry. In the context of the solar panel array shown in FIGS. 4A-4C, it may be useful for those unfamiliar with stay-out zones to consider a "swept extended volume" instead. It is to be understood that a swept extended volume refers to a reference volume defined by the swept volume but extended some distance in either direction along the sweep axis beyond the ends of the swept volume, e.g., a volume with the same axial cross section as the swept volume, but of greater length, e.g., 200% of the length of the swept volume. FIG. 4B depicts side and isometric views of the solar panel array in a fully deployed, aligned state, as well as swept extended volumes of two of the side panels, e.g., first extended swept volume 92 and second extended swept volume 94.

Figure 4C:
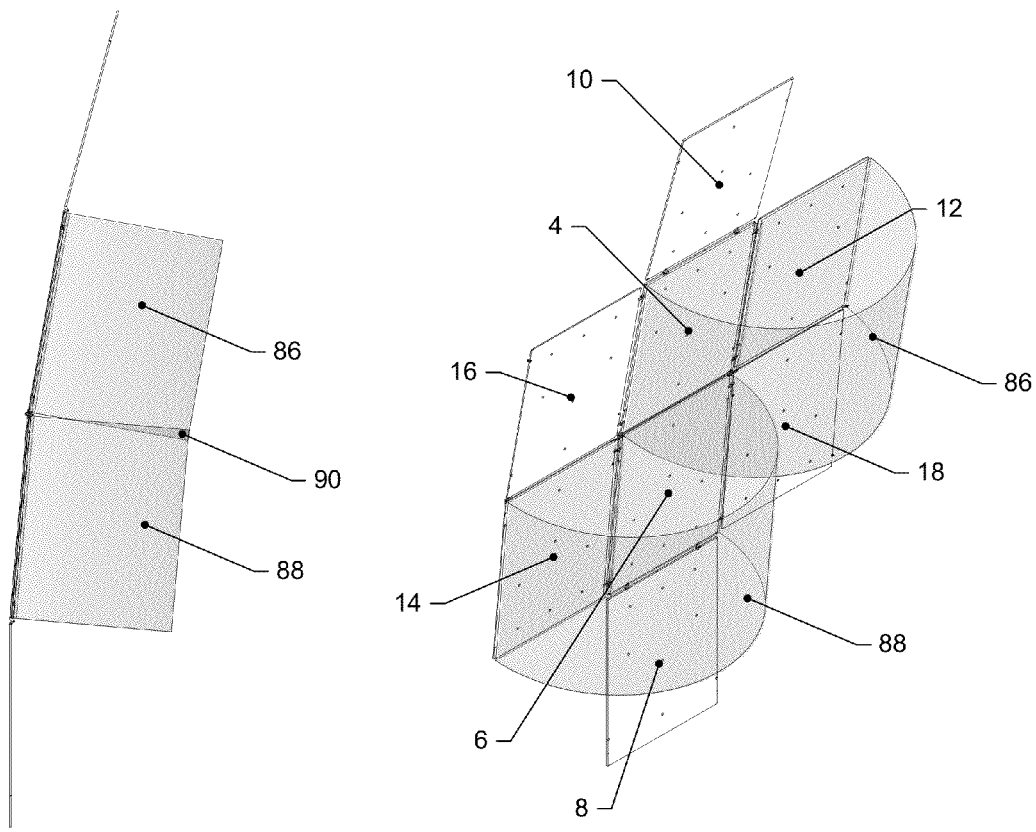
FIG. 4C depicts side and isometric views of the solar panel array in a fully deployed, misaligned state, as well as swept volumes of two of the side panels.

FIG. 4C depicts side and isometric views of the solar panel array in fully deployed, but misaligned, state, as well as swept volumes of two of the side panels. While FIG. 4A depicts the solar panel array in a relatively ideal state, i.e., with the panels fully deployed and aligned, various factors may result in a departure from such an ideal state. For example, compliance in the hinge interfaces between panels may allow for the panels to undergo slight movements with respect to one another. Another source of misalignment may be flexure in the panels themselves. As a result, the solar panels may not actually be co-planar, although they may still be substantially coplanar, and may exhibit small angular misalignments. In FIG. 4C, each panel is shown with approximately a 5 degree misalignment between it and each adjacent panel. As can be seen, this causes the first swept volume 86 and the second swept volume 88 to intersect in collision volume 90. Thus, if the first side panel 12 and the second side panel 14 were to simultaneously swing through the collision volume, they might collide.

"Substantially co-planar," as used herein, is used to describe panels that are co-planar with one another in some configurations or positions. It is to be understood that such a term does not require that the panels be completely co-planar—for example, there may be minor angular misalignments between panels (for example, due to slop in the hinge interfaces connecting them together or due to flexure in the overall panel assembly) or the panels may be offset from one another by small amounts in directions normal to the panels. When viewed from a distance, however, such panels would still appear to be co-planar.

The present inventors, appreciating the undesirability of inter-panel collisions, as well as the limitations of previous solar panel array deployment equipment, recognized that an in-line solar panel having at least two consecutive in-line panels connected with side panels could be advantageous if combined with a sequencing mechanism that prevented or significantly reduced the possibility of collision between the side panels during deployment. Absent such a sequencing mechanism, the only way to reduce the chance of such collisions is to increase the in-line panel spacing (thus allowing more extreme misalignment of the in-line panels before the swept volumes intersect), which is undesirable since it increases the moment of inertia of the solar panel array and possibly reduces the size of the solar panels.

Accordingly, a solar panel array such as that shown in FIG. 3 and FIGS. 4A through 4C may, when implemented using such a sequencing mechanism, exhibit characteristics that are not found in other solar panel arrays without such sequencing mechanisms. Such characteristics may be realized in implementations featuring a passively-driven mechanical sequencing solution (as opposed to a computer-controlled sequencing solution).

"Passively," is used herein to describe the behavior of a mechanism that is not directly actively controlled, e.g., via a computer. For example, a hinge that opens "passively" may be driven into position by a torsion spring or other spring bias mechanism, as opposed to being driven into position by a motor or powered actuator. It is important to realize that a passively driven mechanism's movement may, however, still be initiated by a computer-controlled device. For example, a computer-controlled release latch may release a spring-driven solar panel for deployment; however, the solar panel would still be passively rotated into position. Several passively-driven mechanisms may also be chained together, each activating the next at an appropriate moment.

For example, the gap spacing between adjacent in-line panels, adjacent side panels, and adjacent in-line/side panels may be substantially the same when the solar panel array is in its deployed state. This gap also may be quite small in comparison to the overall size of the solar panel array, e.g., on the order of less than twice the thickness of the solar panels. In some implementations, the gap spacing between the in-line panels may be defined as being sufficiently small that when adjacent in-line panels are at two degrees of misalignment or more with respect to each other, the swept volumes or the stay-out zones of the side panels connected with one of the in-line panels may intersect the swept volumes or the stay-out zones of the side panels connected with the adjacent in-line panel.

While computer-controlled release or drive mechanisms could be used to deploy the solar panel array shown in FIG. 3 and FIGS. 4A through 4C, the use of such computer-controlled mechanisms is undesirable when a mechanical sequencing system may be used to accomplish the same end result without undue cost, weight, or complexity. This is because purely mechanical systems are highly reliable when compared to computer-controlled devices. For example, a computer-controlled sequencing mechanism might require a power source, a computer, software, a computer-controlled actuator, a position sensor, and power and signal routing to the actuator, all of which may serve as a potential failure mode. Accordingly, the inventors developed a mechanical sequencing mechanism, which is detailed further below.

Figure 5:
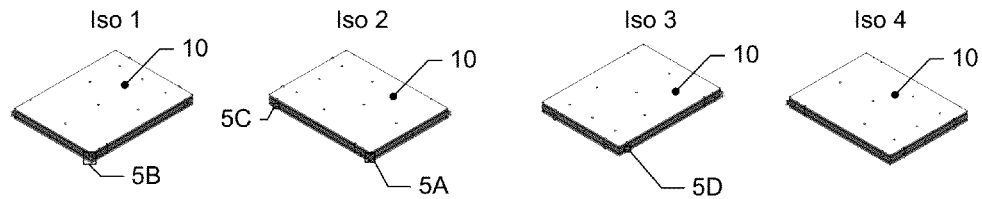

FIG. 5 depicts the solar panel array in a stowed configuration. In the stowed configuration, the various panels may be arranged in a stacked formation. In the particular implementation shown, the order of the panels is: fourth in-line panel 10, first side panel 12, third side panel 16, first in-line panel 4, second in-line panel 6, fourth side panel 18, second side panel 14, and third in-line panel 8, with the fourth in-line panel 10 visible on the top of the stack. Other stacking arrangements may be used as well, with appropriate modification of the hinge and sequencing hardware discussed below.

Figure 5A:
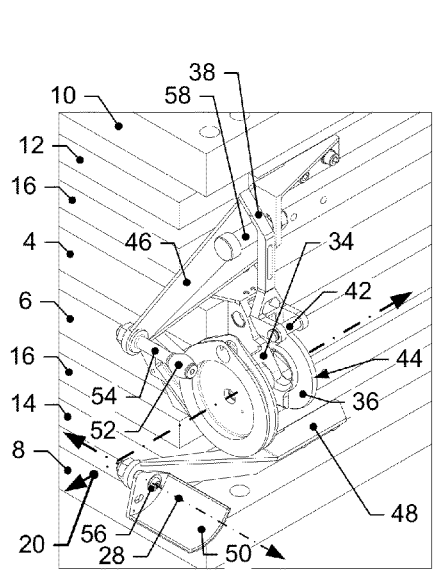
FIG. 5A depicts a detail view of the solar panel array of FIG. 5 corresponding with the region marked 5A in FIG. 5.
Figure 5B:
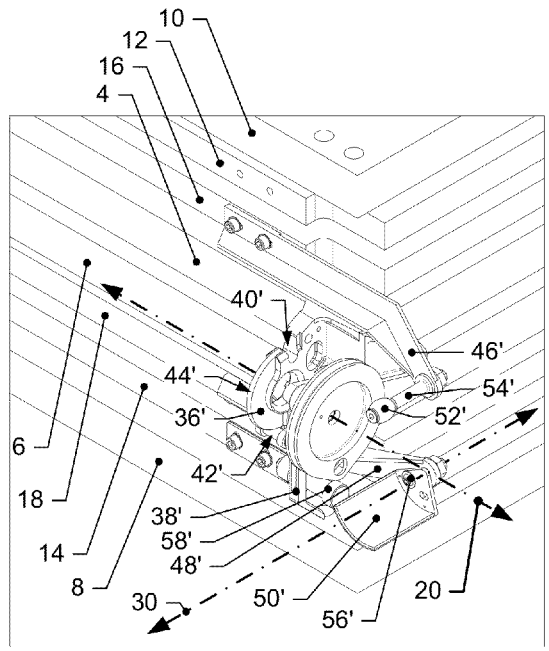
FIG. 5B depicts a detail view of the solar panel array of FIG. 5 corresponding with the region marked 5B in FIG. 5.

FIG. 5A depicts a detail view of the solar panel array of FIG. 5 corresponding with the region marked 5A in FIG. 5. FIG. 5B depicts a detail view of the solar panel array of FIG. 5 corresponding with the region marked 5B in FIG. 5. While it may appear that the components shown in FIGS. 5A and 5B are the same components, it is to be understood that each Figure shows at least some components that are different. To assist, components that are unique to FIG. 5B are differentiated from their analogs in FIG. 5A by appending an apostrophe to the end of the relevant reference numeral (this convention is repeated throughout all of the Figures). Visible in both FIGS. 5A and 5B are the fourth in-line panel 10, the first side panel 12, the third side panel 16, the first in-line panel 4, the second in-line panel 6, the fourth side panel 18, the second side panel 14, and the third in-line panel 8, as well as the first in-line hinge axis 20.

Also visible in FIG. 5A are an in-line hinge base 34 (connected to the second in-line panel 6), and in-line hinge bracket 36 (connected to the first in-line panel 4). The in-line hinge base 34 and the in-line hinge bracket 36 may be pivotally connected with each other, e.g., via a bearing or other rotational interface (not shown), so as to rotate with respect to each other about the first in-line hinge axis 20. An in-line restraint mechanism 38 may be rotatably connected with the in-line hinge base 34. The in-line restraint mechanism 38 may feature an in-line hinge cam follower 42 that is configured to ride along an in-line hinge cam surface 44 while the in-line hinge bracket 36 and the in-line hinge base 34 are rotated relative to each other. The in-line restraint mechanism 38 may be sprung so as to force the in-line hinge cam follower 42 into contact with the in-line hinge cam surface 44. The in-line hinge cam surface 44 may support the in-line hinge cam follower 42 throughout most of the travel distance of the in-line hinge. The in-line hinge cam surface 44 may terminate in an in-line hinge locking recess (not shown in FIG. 5A, but similar to the in-line hinge locking recess 40' in FIG. 5B) that is configured to receive the in-line hinge cam follower 42. The in-line hinge cam follower 42 may be driven into the in-line hinge locking recess by the same spring force that may force the in-line hinge cam follower 42 into contact with the in-line hinge cam surface 44. The in-line hinge locking recess may thus prevent further rotational movement of the in-line hinge bracket 36 and the in-line hinge base 34 with respect to each other after the two components have swung through a desired range of rotational motion, e.g., 180 degrees.

The in-line restraint mechanism 38 may engage with (or be configured to engage with) an in-line hinge lock post 58, which may be connected to the first side panel 12 by a bracket. The in-line restraint mechanism 38 may prevent substantial rotational movement of the first side panel 12 with respect to the second in-line panel 6 by providing a positive stop that the in-line hinge lock post 58 may encounter.

FIG. 5B depicts many components that are similar to those discussed above with reference to FIG. 5A. For example, FIG. 5B depicts an in-line restraint mechanism 38', an in-line hinge base 34', an in-line hinge bracket 36', an in-line hinge cam follower 42', and an in-line hinge cam surface 44'. Many of these components are similar in construction and function to components in the "deployment and locking mechanism" described in U.S. Pat. No. 6,010,096.

However, there are additional components shown in FIGS. 5A and 5B that do not have any analogues in U.S. Pat. No. 6,010,096. These additional components may be used to provide for sequencing of side panel deployment between adjacent in-line panels. For example, also shown in FIG. 5A are a sequencer roller bracket 46 (connected to the first side panel 12) and a sequencer restraint bracket 48 (connected to the second side panel 14). The sequencer roller bracket 46 may support a roller 52 on a post 54; the roller 52 may have a roller axis (not shown) that is substantially perpendicular to the first in-line hinge axis 20. The sequencer roller bracket 46 may also support the in-line hinge lock post 58. The sequencer restraint bracket 48 may support a restraint surface 50; an adjustment screw 56 may allow the restraint surface to be adjusted with respect to the sequencer restraint bracket 48. The restraint surface 50 may, as shown, be a surface of revolution (or, more correctly, a solid part with a surface facing the roller 52 that is a surface of revolution). However, in other implementations, the restraint surface 50 may be any surface that the roller 52 may contact and roll or slide freely along, e.g., curved, non-circular sections. The center axis of the surface of revolution may also be substantially perpendicular to the first in-line hinge axis 20.

FIG. 5B depicts similar structures, e.g., a sequencer roller bracket 46', a sequencer restraint bracket 48', a roller 52', a post 54', a restraint surface 50', and an adjustment screw 56'.

Figure 5C:
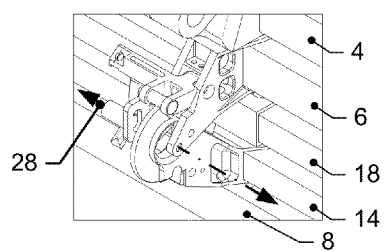
FIG. 5C depicts a detail view of the solar panel array of FIG. 5 corresponding with the region marked 5C in FIG. 5.
Figure 5D:
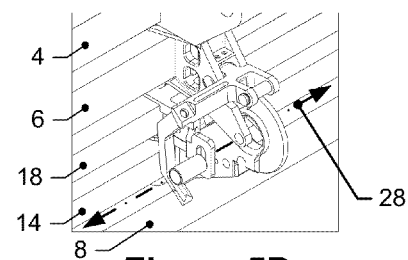
FIG. 5D depicts a detail view of the solar panel array of FIG. 5 corresponding with the region marked 5D in FIG. 5.

FIG. 5C depicts a detail view of the solar panel array of FIG. 5 corresponding with the region marked 5C in FIG. 5. FIG. 5D depicts a detail view of the solar panel array of FIG. 5 corresponding with the region marked 5D in FIG. 5. FIGS. 5C and 5D depict a second side hinge interface that joins the second in-line panel 6 with the second side panel 14 and that provides rotation about the second side hinge axis 28. Such a second side hinge interface may also restrain movement of the fourth side panel 18 with respect to the second in-line panel 6 until the second side panel 14 has fully opened. The second side hinge interface may also operate in substantially the same manner as the "deployment and locking mechanism" described in U.S. Pat. No. 6,010,096.

FIG. 6 depicts the solar panel array with the in-line panels approximately 50% extended. As can be seen, during the deployment of the in-line panels, the first side panel 12, the second side panel 14, the third side panel 16, and the fourth side panel 18 are each restrained from substantial rotational movement with respect to the in-line panel to which each is rotatably connected. For example, the first side panel 12 may be restrained from such movement during in-line panel deployment by the in-line hinge restraint mechanism 38 discussed earlier. The second side panel 14 may be similarly restrained from such movement by the in-line hinge restraint mechanism 38' located at the opposite end of the first in-line hinge axis 20. The third side panel 16 and the fourth side panel 18 may, for example, be restrained from such movement by side hinge restraint mechanisms integrated with the hinge interfaces connecting the first side panel 12 and the second side panel 14, respectively, also similar to those discussed in U.S. Pat. No. 6,010,096, during in-line panel deployment. As can be seen, the included angle between each pair of adjacent in-line panels at this stage of deployment is approximately 90 degrees. The first side panel 12 and the third side panel 16 may generally move as a unit with the first in-line panel 4, and the second side panel 14 and the fourth side panel 18 may generally move as a unit with the second in-line panel 6 during deployment of the in-line panels.

FIG. 6A depicts a detail view of the solar panel array of FIG. 6 corresponding with the region marked 6A in FIG. 6. FIG. 6B depicts a detail view of the solar panel array of FIG. 6 corresponding with the region marked 6B in FIG. 6. As can be seen in these Figures, the in-line hinge restraint mechanism 38' has not yet released the in-line hinge lock post 58' connected with the second side panel 14, thus ensuring that the second side panel 14 cannot deploy while the in-line panels are in mid-deployment. The rotation of the first in-line panel 4 and the second in-line panel 6 about the first in-line hinge axis 20 causes the sequencer roller bracket 46' and the sequencer restraint bracket 48' to rotate about (or substantially about) the first in-line hinge axis 20 as well. This causes the roller 52' to approach the restraint surface 50'. While not depicted, the in-line hinge restraint mechanism 38, the in-line hinge lock post 58, the sequencer roller bracket 46, the sequencer restraint bracket 48, the roller 52, and the restraint surface 50 may behave in a similar manner.

Figure 7:
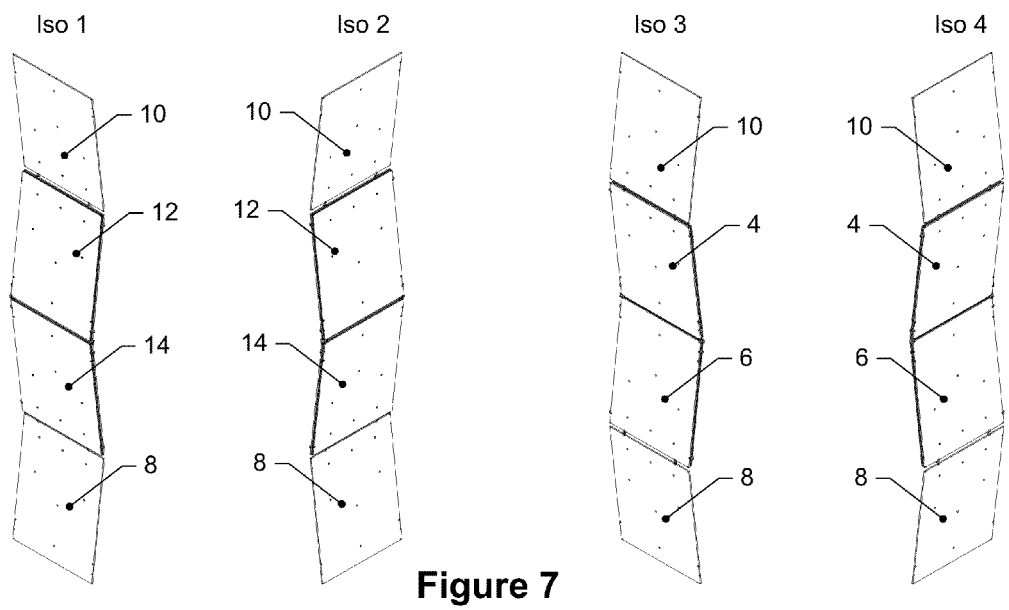
Figures 7A, 7B:
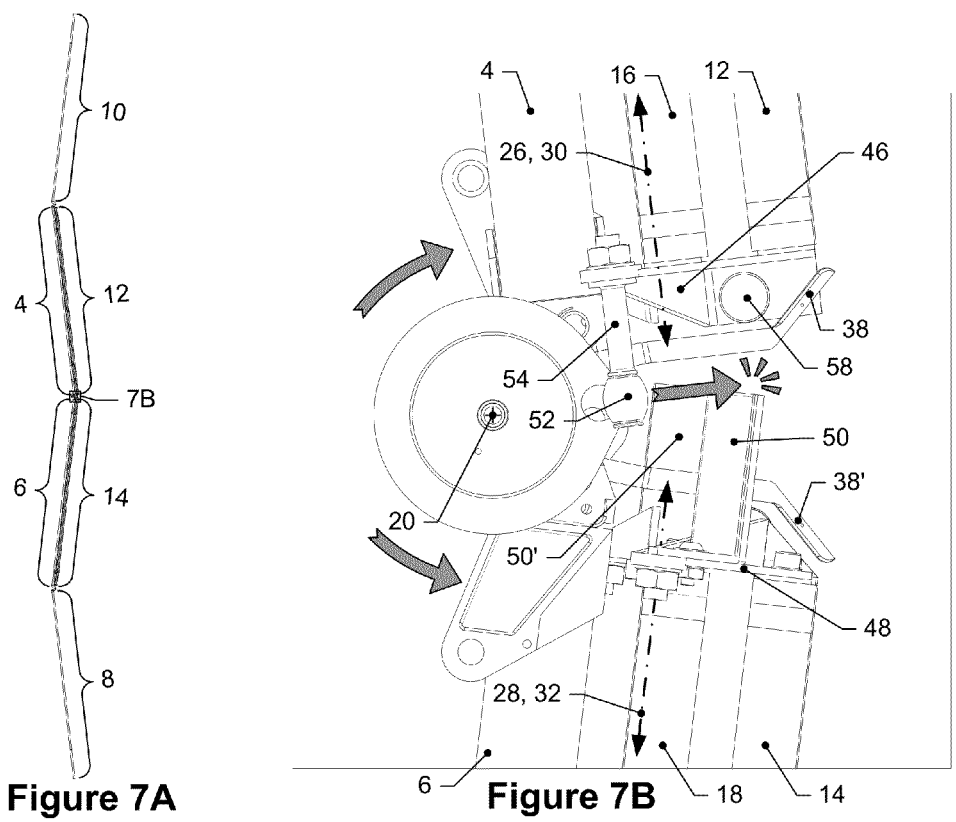
FIG. 7A depicts the solar panel array shown in FIG. 7 from a side view.
FIG. 7B depicts a detail view of the solar panel array shown in FIG. 7A corresponding with the region marked 7B in FIG. 7A.

FIG. 7 depicts the solar panel array with the in-line panels nearly completely deployed. FIG. 7A depicts the solar panel array shown in FIG. 7 from a side view. FIG. 7B depicts a detail view of the solar panel array shown in FIG. 7A corresponding with the region marked 7B in FIG. 7A. At this stage of in-line panel deployment, the restraint surface 50 and the roller 52 have rotated sufficient far enough about the first in-line hinge axis 20 that were the first side panel 12 to be released by in-line hinge restraint mechanism 38 at this time (something that hinge restraint mechanism 38 does not normally permit in the pictured configuration), the rotational movement of the first side panel 12 about the first side hinge axis 26 (see FIG. 3) would be minimal since the roller 52 would collide with the restraint surface 50, which would prevent further rotational movement of the first side panel 12 with respect to the first in-line panel 4.

It is to be understood that there are two separate restraint mechanism systems that may prevent movement of the side panels during different stages of deployment. In the stowed configuration and during much of the in-line panel deployment, the first restraint mechanism system may be used to restrain the side panels, e.g., the in-line hinge restraint mechanisms 38 and 38' may both be engaged so as to block the in-line hinge lock posts 58 and 58', respectively, and to function as a restraint for the first side panel 12 and the second side panel 14, respectively. The in-line hinge restraint mechanisms 38 and 38', however, may both be configured to release their respective side panels simultaneously since their release behaviors are both tied to their common rotation about the first in-line hinge axis 20, e.g., when the in-line panels are fully deployed.

To prevent simultaneous deployment of the first side panel 12 and the second side panel 14 after the in-line panels are fully deployed, the second restraint mechanism system, which may include the restraint surfaces 50 and 50' as well as the rollers 52 and 52', may be engaged. In the stowed configuration and during most of the in-line panel deployment, the second restraint mechanism system may not provide any potential restraint of the side panels (although the side panels may be restrained, for example, by the first restraint mechanism system, as discussed above). The second restraint mechanism system, however, may be configured to transition to a restraining configuration during in-line panel deployment, e.g., such as is shown in FIG. 7B, so that the second restraint mechanism system may, for example, substantially restrain the first side panel 12 once the in-line hinge restraint mechanism 38 releases the first side panel 12.

The phrase "substantially restrain" may be used in this disclosure to describe a restraint relationship that may restrain one part relative to another part such that gross movement of the restrained part with respect to the other part is prevented, but movement of the substantially restrained part with respect to the other part may be permitted within the confines of the mechanism providing the restraint. For example, a door chain (such as those found on many hotel room doors) substantially restrains a door from fully opening when engaged, but still allows the door to be moved between the closed state and a slightly ajar state.

Figure 8:
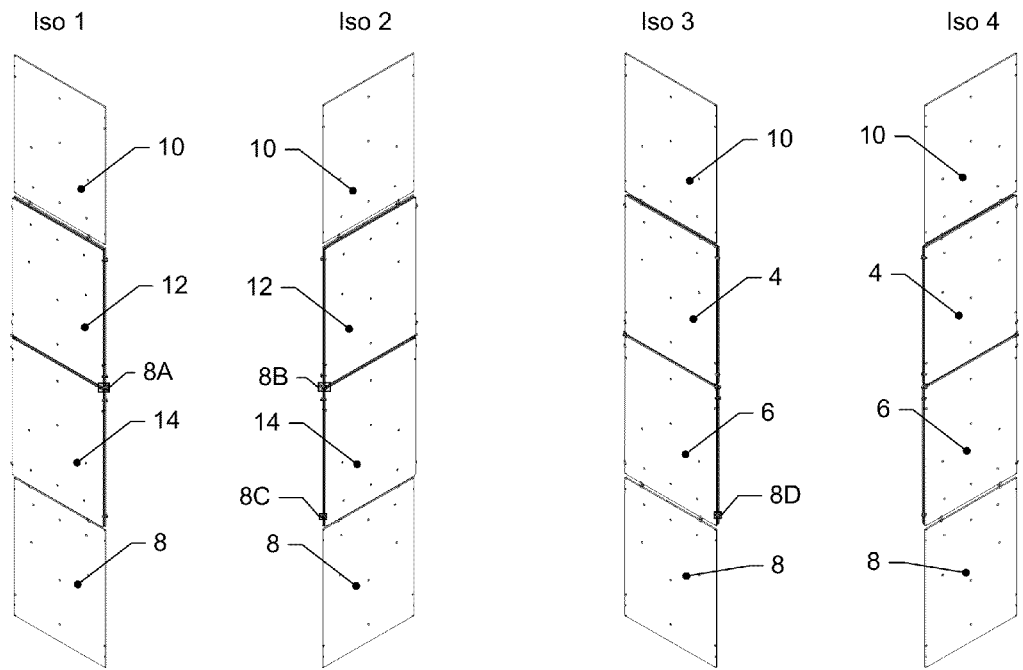

FIG. 8 depicts the solar panel array with the in-line panels fully deployed. After allowing each in-line panel to rotate through 180 degrees, the side hinge interfaces with which the first in-line hinge axis 20, the second in-line hinge axis 22, and the third in-line hinge axis 24 are associated subsequently lock, preventing movement past 180 degrees. Simultaneously with this locking, the first side panel 12 and the second side panel 14 are both released by the in-line hinge restraint mechanisms 38 and 38', respectively. Some of these interactions are discussed in more depth below.

Figures 8A, 8B:
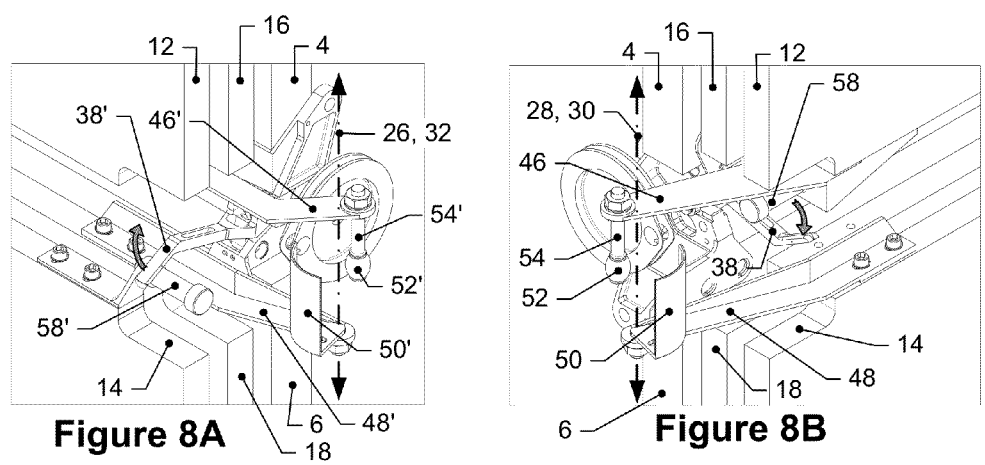
FIG. 8A depicts a detail view of the solar panel array of FIG. 5 corresponding with the region marked 8A in FIG. 8.
FIG. 8B depicts a detail view of the solar panel array of FIG. 5 corresponding with the region marked 8B in FIG. 8.

FIG. 8A depicts a detail view of the solar panel array of FIG. 5 corresponding with the region marked 8A in FIG. 8. As can be seen in FIG. 8A, the in-line hinge restraint mechanism 38' has rotated due to the engagement of the in-line hinge cam follower 42' with the in-line hinge locking recess 40' (neither is visible in this Figure, however). The rotation of the in-line hinge restraint mechanism 38' has caused the in-line hinge lock post 58' to be released, allowing the second side panel 14 to rotate about the second side hinge axis 28 (see FIG. 8B).

FIG. 8B depicts a detail view of the solar panel array of FIG. 5 corresponding with the region marked 8B in FIG. 8. As can be seen in FIG. 8A, the in-line hinge restraint mechanism 38 has rotated due to the engagement of the in-line hinge cam follower 42 with the in-line hinge locking recess 40 (neither is visible in this Figure, however). The rotation of the in-line hinge restraint mechanism 38 has caused the in-line hinge lock post 58 to be released, allowing the first side panel 12 to rotate about the first side hinge axis 26 (see FIG. 8A). The rotation of the first side panel 12 about the first side hinge axis 26 is, however, constrained by the presence of the restraint surface 50, which the roller 52 will run into and that will prevent further rotational movement of the first side panel 12 about the first side hinge axis 26, at least until the restraint surface 50 is rotated about the second side hinge axis 28 to allow for further rotational movement of the first side panel 12 about the first side hinge axis 26.

Figure 9:
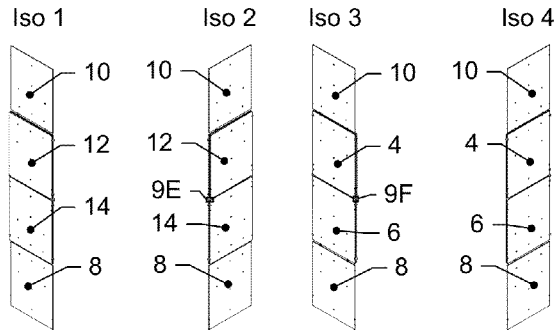
Figure 9B:
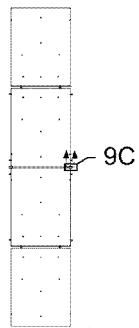
FIG. 9B depicts a plan view of the solar panel array as shown in FIG. 9.
Figure 9A:
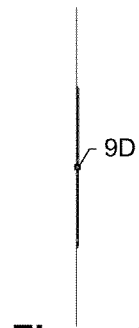
FIG. 9A depicts a side view of the solar panel array as shown in FIG. 9.
Figure 9C:
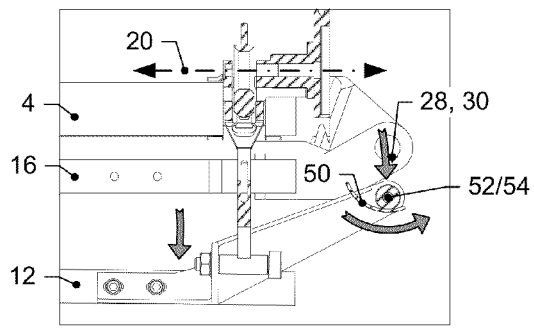
FIG. 9C depicts a detail section view of the solar panel array as shown in FIG. 9B corresponding with the region marked 9C in FIG. 9B.
Figure 9F:
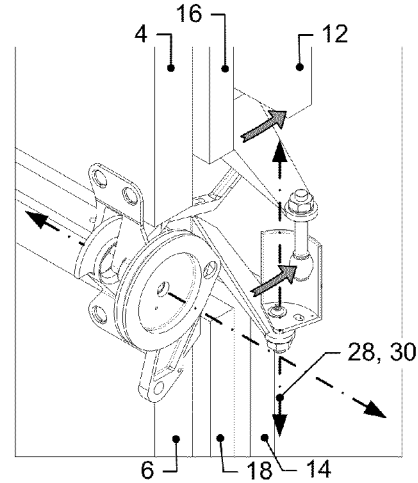
FIG. 9F depicts a detail view of the solar panel array of FIG. 9 corresponding with the region marked 9F in FIG. 9.
Figure 9D:
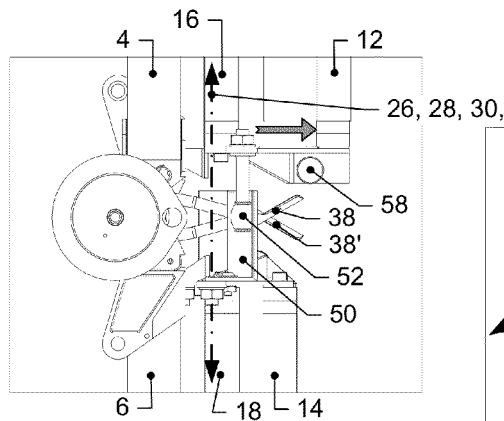
FIG. 9D depicts a detail view of the solar panel array of FIG. 9A corresponding with the region marked 9D in FIG. 9A.
Figure 9E:
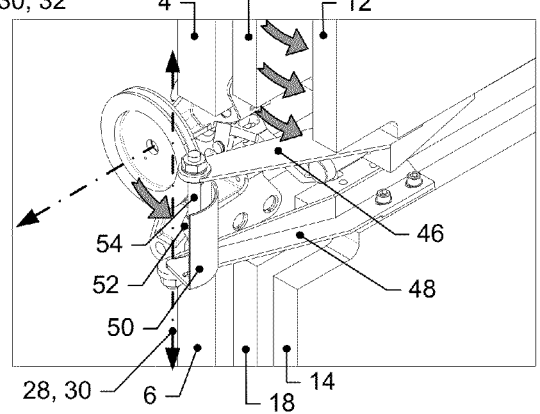
FIG. 9E depicts a detail view of the solar panel array of FIG. 9 corresponding with the region marked 9E in FIG. 9.

FIG. 9 depicts the solar panel array with the in-line panels fully deployed and with one of the side panels partially deployed. FIG. 9A depicts a side view of the solar panel array as shown in FIG. 9. FIG. 9B depicts a plan view of the solar panel array as shown in FIG. 9. FIG. 9C depicts a detail section view of the solar panel array as shown in FIG. 9B corresponding with the region marked 9C in FIG. 9B. FIG. 9D depicts a detail view of the solar panel array of FIG. 9A corresponding with the region marked 9D in FIG. 9A. FIG. 9E depicts a detail view of the solar panel array of FIG. 9 corresponding with the region marked 9E in FIG. 9. FIG. 9F depicts a detail view of the solar panel array of FIG. 9 corresponding with the region marked 9F in FIG. 9.

As can be seen in FIG. 9C, the first side panel 12 has rotated about the first side hinge axis 26, as indicated by the arrow above the roller 52, but has stopped since the roller 52 has come into contact with the restraint surface 50. As the second side panel 14 rotates about the second side hinge axis 28, the restraint surface 50 will also rotate about, or substantially about, the second side hinge axis 28, as indicated by the curved arrow below the restraint surface 50. FIG. 9D shows this same interaction from a view along the first in-line hinge axis 20. FIGS. 9E and 9F also show the same interactions, but from different isometric perspectives.

FIG. 10 depicts the solar panel array with the in-line panels fully deployed and with one of the side panels partially deployed. In FIG. 10, the second side panel 14 has rotated approximate 45 degrees about the second side hinge axis 28 from the stowed configuration.

FIG. 10A depicts a detail view of the solar panel array of FIG. 10 corresponding with the region marked 10A in FIG. 10. FIG. 10B depicts a detail view of the solar panel array of FIG. 10 corresponding with the region marked 10B in FIG. 10. As can be seen, the second side panel 14, which may be connected with the second in-line panel 6 via a hinge interface including a side hinge base 60 and a side hinge bracket 62, has rotated approximately 45 degrees about the second side axis 28. Restraint surface 50, which is attached to the second side panel 14 via the sequencer restraint bracket 48, has also rotated a corresponding amount about the second side axis 28.

FIG. 10C depicts a detail view of the solar panel array of FIG. 10 corresponding with the region marked 10C in FIG. 10. FIG. 10C depicts another side hinge interface similar to the one shown in FIG. 10A. The side hinge interface shown in FIG. 10C, however, also includes a side hinge restraint mechanism 64 and a side hinge cam follower 66. While such components are not depicted in FIG. 10A, the hinge interface shown in FIG. 10A may also or alternatively include such components. As suggested earlier, the side hinge interface shown may function in a manner similar to the "deployment and locking mechanism" described in U.S. Pat. No. 6,010,096.

Figure 11:
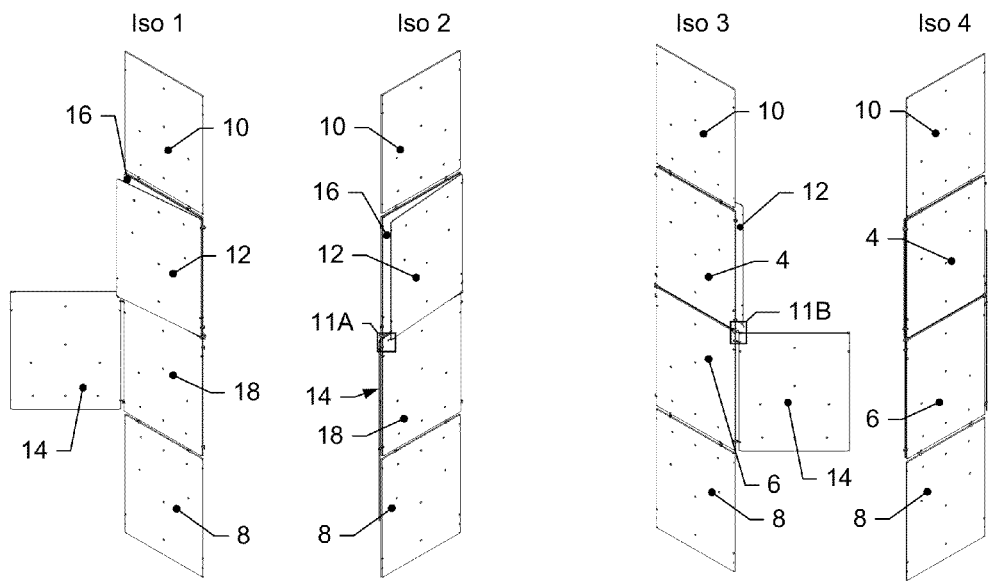
Figure 11A:
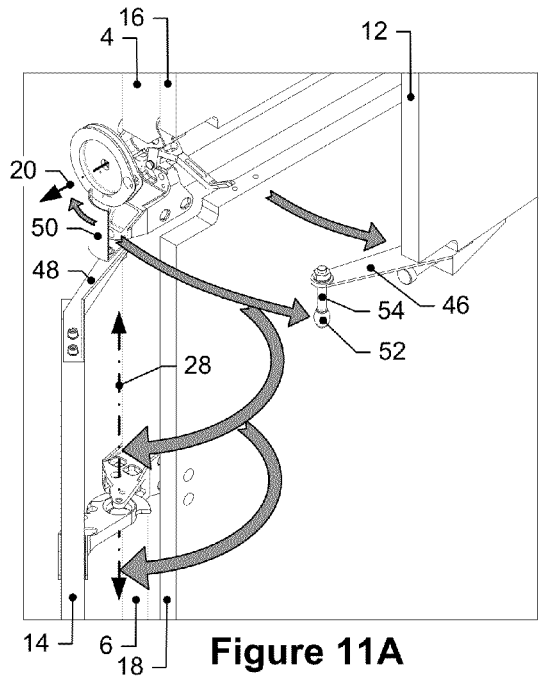
FIG. 11A depicts a detail view of the solar panel array of FIG. 11 corresponding with the region marked 11A in FIG. 11.
Figure 11B:
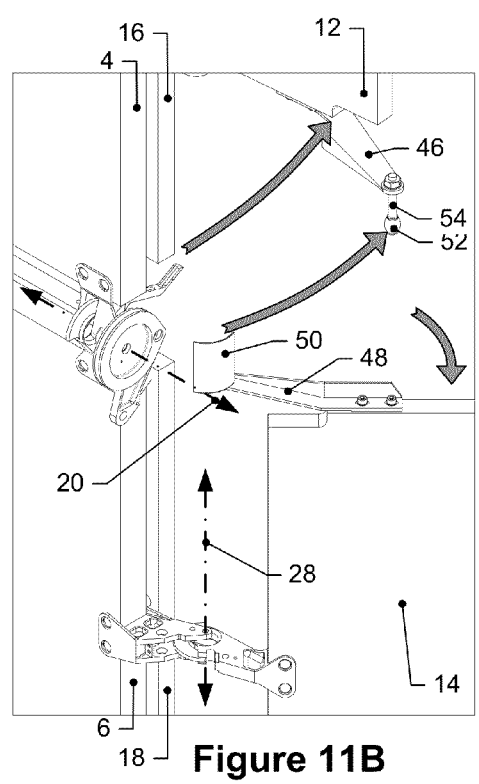
FIG. 11B depicts a detail view of the solar panel array of FIG. 11 corresponding with the region marked 11B in FIG. 11.

FIG. 11 depicts the solar panel array with the in-line panels fully deployed and with two of the side panels partially deployed. In this stage of deployment, the second side panel 14 has rotated clear of the swept volume or the stay-out zone of the first side panel 12, and the second side panel 14 and the restraint surface 50 have rotated far enough about the second side hinge axis 28 that the restraint surface 50 no longer prevents the rotation of the first side panel 12 and the roller 52 about the first side hinge axis 26. Accordingly, the first side panel 12 is now free to rotate about the first side hinge axis 26, as shown in FIGS. 11A and 11B. FIG. 11A depicts a detail view of the solar panel array of FIG. 11 corresponding with the region marked 11A in FIG. 11. FIG. 11B depicts a detail view of the solar panel array of FIG. 11 corresponding with the region marked 11B in FIG. 11. The amount of angular rotation that the second side panel must undergo before it is rotated clear of the swept volume or the stay-out zone may ultimately be determined by the specific geometries of the panels and the hinges used, in many implementations, this angular rotation may be between approximately 70 and 90 degrees.

Figure 12:
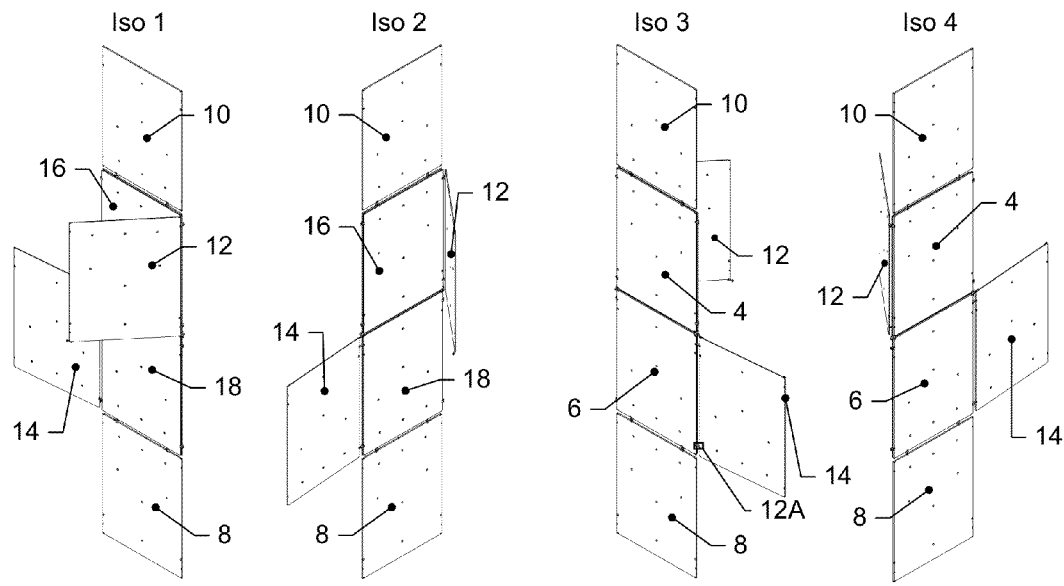
Figure 12A:
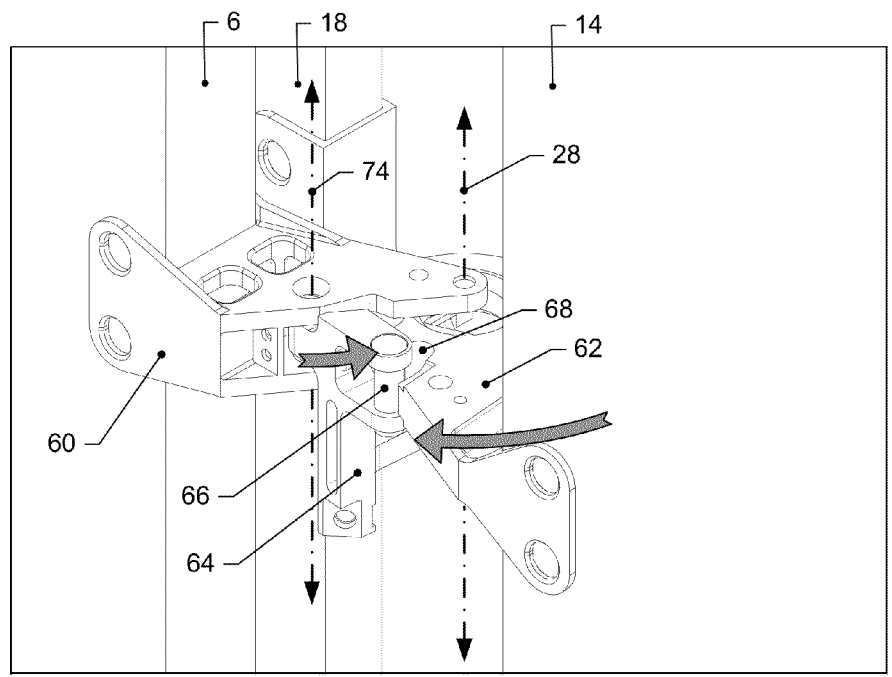
FIG. 12A depicts a detail view of the solar panel array of FIG. 12 corresponding with the region marked 12A in FIG. 12.

FIG. 12 depicts the solar panel array with the in-line panels fully deployed and with two of the side panels further partially deployed. While the second side panel 14 may appear to be completely deployed in FIG. 12, a careful examination of the Figure reveals that the second side panel 14 has not quite reached full deployment. As can be seen in FIG. 12A, which depicts a detail view of the solar panel array of FIG. 12 corresponding with the region marked 12A in FIG. 12, the side hinge bracket 62 has rotated nearly 180 degrees with respect to the side hinge base 60. This has caused the side hinge cam follower 66 to slide/roll along the side hinge cam surface 70 (not clearly visible in this view, but visible in FIG. 10C) until the side hinge cam follower 66 is poised at the lip of the side hinge locking recess 68. Once the side hinge bracket 62 has rotated 180 degrees with respect to the side hinge base 60, the side hinge cam follower 66 will be forced into the side hinge locking recess 68, locking the side hinge interface into the 180 degree position and simultaneously causing the side hinge restraint mechanism 64 to release the fourth side panel 18.

Figure 13:
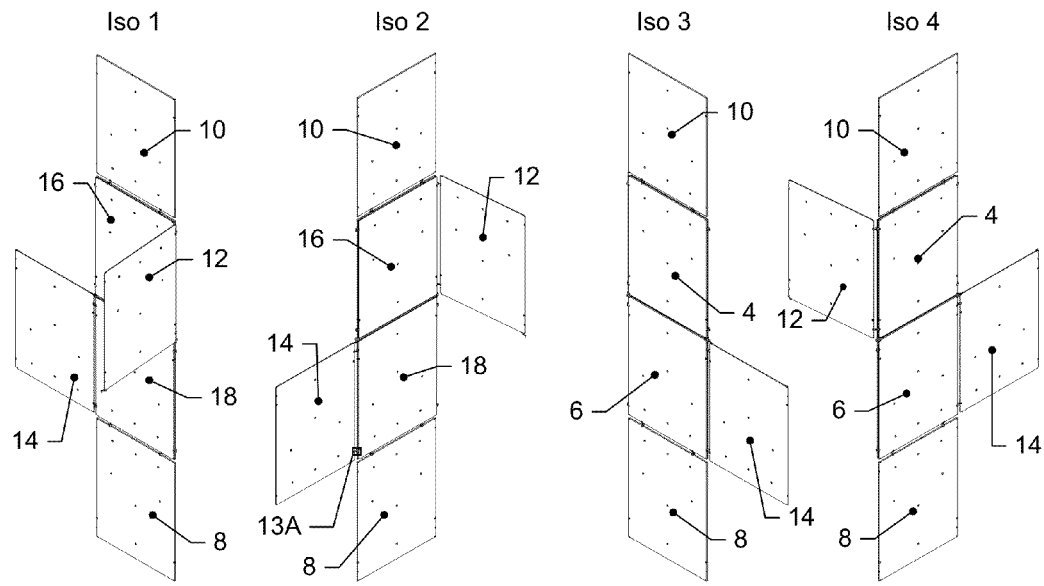
Figure 13A:
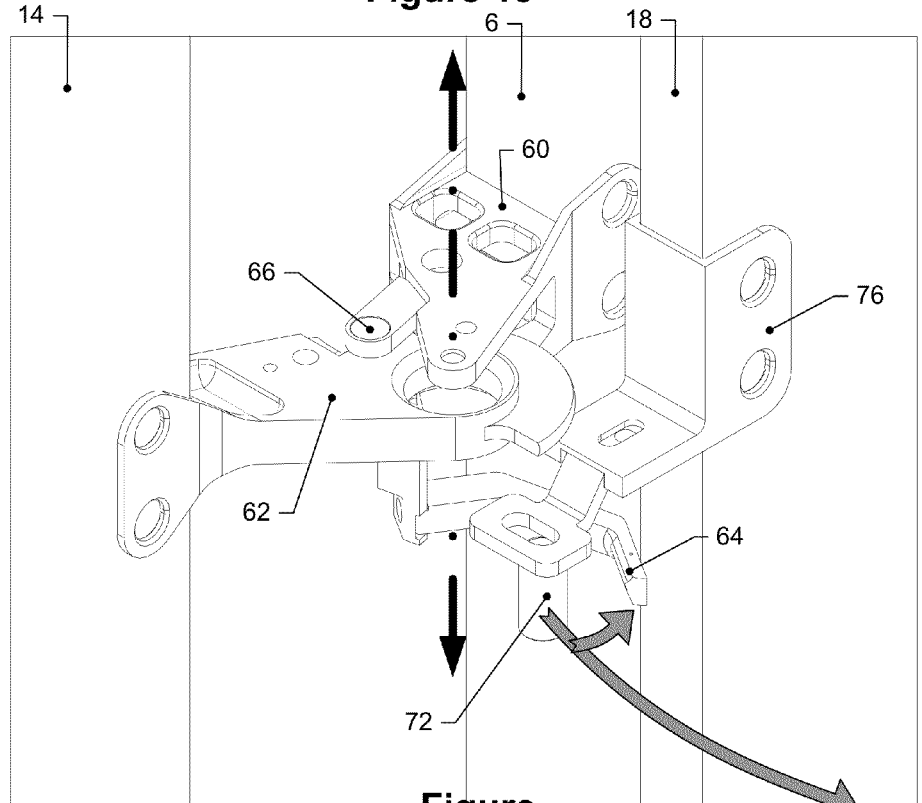
FIG. 13A depicts a detail view of the solar panel array of FIG. 13 corresponding with the region marked 13A in FIG. 13.

FIG. 13 depicts the solar panel array with the in-line panels and one side panel fully deployed. FIG. 13A depicts a detail view of the solar panel array of FIG. 13 corresponding with the region marked 13A in FIG. 13. FIGS. 13 and 13A depict the release of the fourth side panel 18. As can be seen, the side hinge bracket 62 has rotated 180 degrees with respect to the side hinge base 60, the side hinge cam follower 66 has engaged the side hinge locking recess 68, locking the side hinge interface into the 180 degree position, and the side hinge restraint mechanism 64 has released the fourth side panel 18 by moving out of the path of a side hinge lock post 72, which is connected to the fourth side panel 18 by a side hinge lock post bracket 76.

Figure 14:
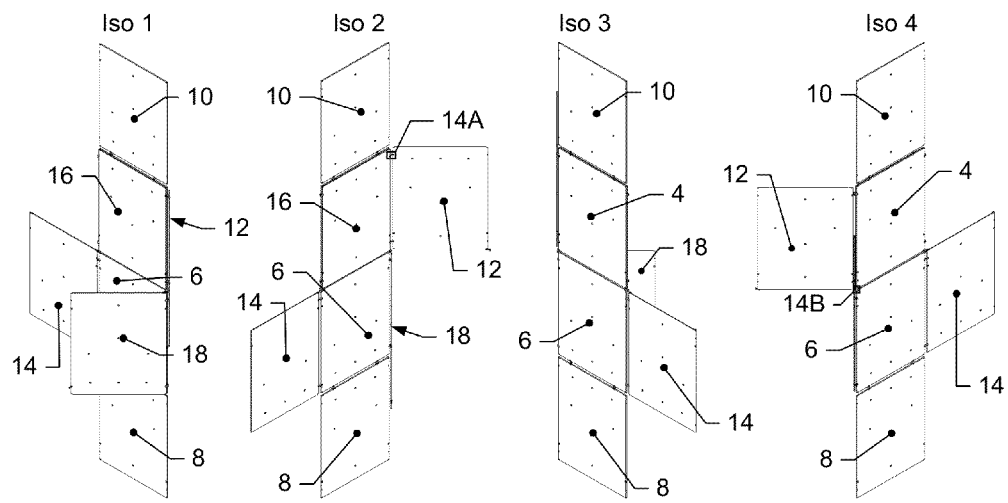

FIG. 14 depicts the solar panel array with the in-line panels and one side panel fully deployed and with two of the side panels partially deployed. In FIG. 14, the second side panel 14 is completely deployed, the fourth side panel 18 has rotated approximately 45 degrees, and the first side panel 12 has rotated approximately 135 degrees.

Figure 14A:
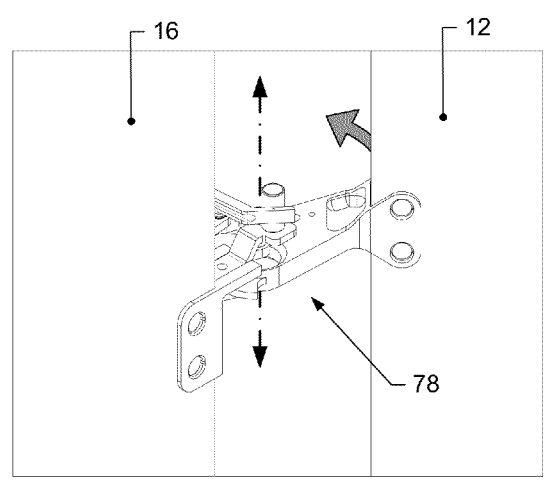
FIG. 14A depicts a detail view of the solar panel array of FIG. 14 corresponding with the region marked 14A in FIG. 14.

FIG. 14A depicts a detail view of the solar panel array of FIG. 14 corresponding with the region marked 14A in FIG. 14. Visible in FIG. 14A is a side hinge interface that rotatably connects the first side panel 12 with the first side panel 4 (not visible in this view). This side hinge interface also restrains the third side panel 16 from rotating about the third side hinge axis 30 until the first side panel 4 has fully deployed.

Figure 14B:
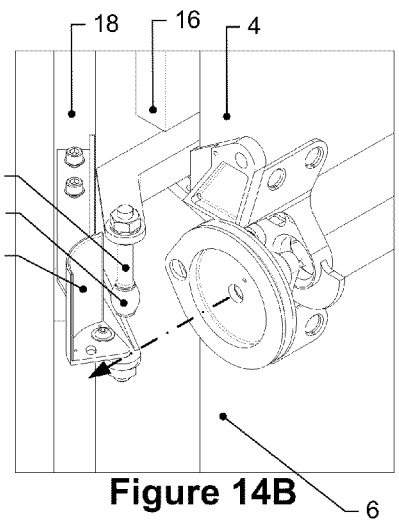
FIG. 14B depicts a detail view of the solar panel array of FIG. 14 corresponding with the region marked 14B in FIG. 14.

FIG. 14B depicts a detail view of the solar panel array of FIG. 14 corresponding with the region marked 14B in FIG. 14. As can be seen in FIG. 14B, the restraint surface 50' is not in contact with the roller 52' since the side hinge interface of FIG. 14A restrains the third side panel 16 and prevents the third side panel 16, as well as the roller 52' that is attached to it, from rotating so as to contact the restraint surface 50'. However, if, for some reason, this side hinge interface were to release the third side panel 16 at this juncture, the third side panel 16 would only rotate a small amount before the roller 52' would be stopped by the restraint surface 50'. This ensures that the third surface 16 does not begin deploying until after the fourth panel 18 has rotated clear of the swept volume or the stay-out zone of the third side panel 16. Again, in many implementations, this may translate to between 70 and 90 degrees of rotation.

Figure 15:
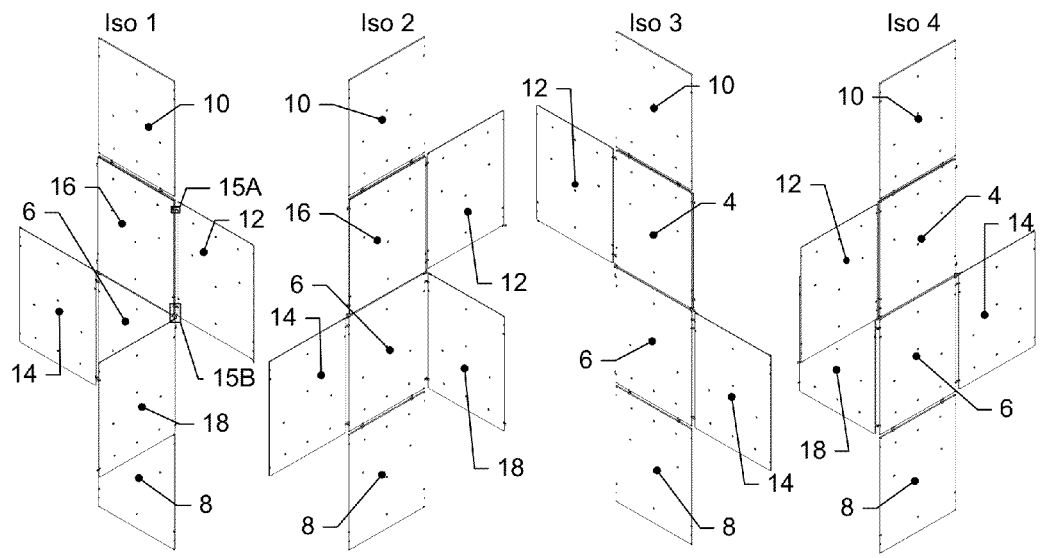

FIG. 15 depicts the solar panel array with the in-line panels and two side panels fully deployed. In FIG. 15, the first side panel 12 and the second side panel 14 have both fully deployed, and the fourth side panel has rotated approximately 90 degrees.

Figure 15A:
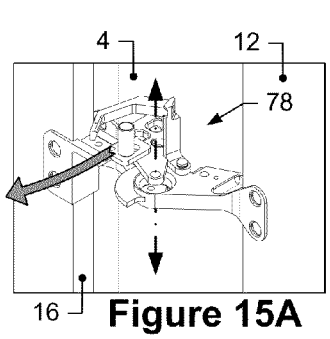
FIG. 15A depicts a detail view of the solar panel array of FIG. 15 corresponding with the region marked 15A in FIG. 15.
Figure 15B:
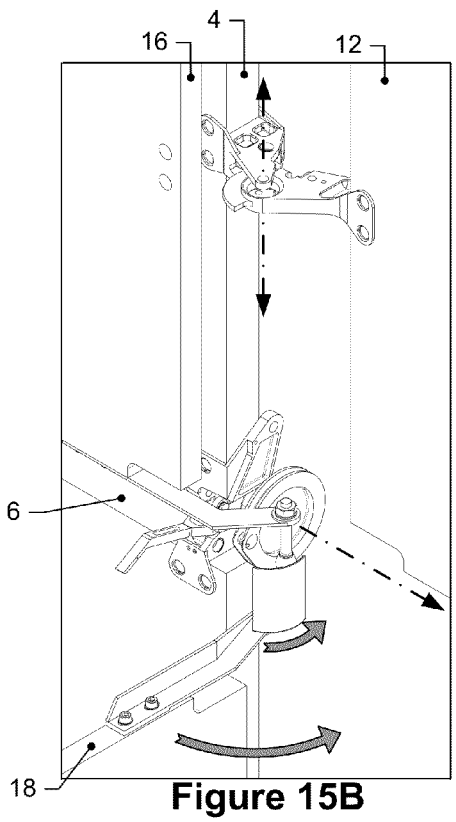
FIG. 15B depicts a detail view of the solar panel array of FIG. 15 corresponding with the region marked 15B in FIG. 15.

FIG. 15A depicts a detail view of the solar panel array of FIG. 15 corresponding with the region marked 15A in FIG. 15. FIG. 15B depicts a detail view of the solar panel array of FIG. 15 corresponding with the region marked 15B in FIG. 15. As can be seen, the third side panel 16 has been released simultaneously with locking of the pictured hinge interface in the fully deployed state. Since the restraint surface 50' has also rotated sufficiently far enough about the fourth side hinge axis 32 that the roller 52' will not contact the restraint surface 50', there are no further barriers to the deployment of the third side panel 16.

Figure 16:
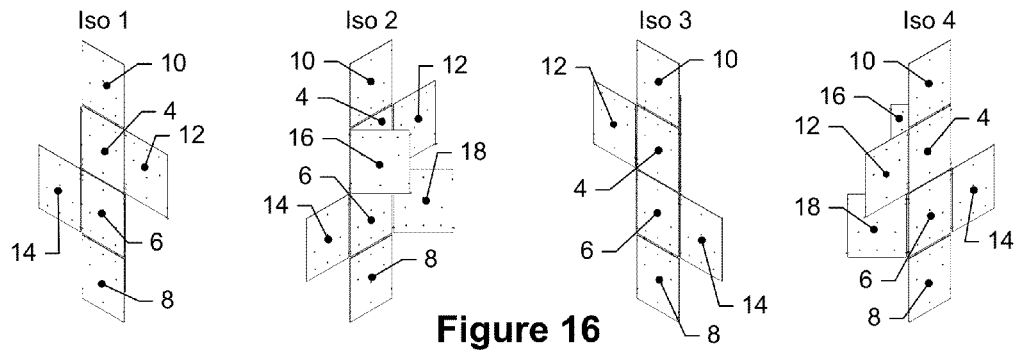

FIG. 16 depicts the solar panel array with the in-line panels and two side panels fully deployed and two side panels partially deployed. In this stage of deployment, the first side panel 12 and the second side panel 14 have both fully deployed, the third side panel 16 has rotated approximately 45 degrees about the third side hinge axis 30, and the fourth side panel 18 has rotated approximately 135 degrees about the fourth side hinge axis 32.

Figure 17:
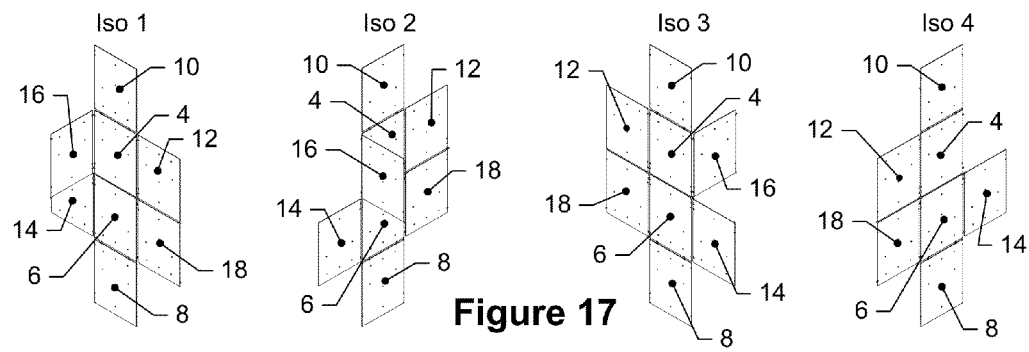

FIG. 17 depicts the solar panel array with the in-line panels and three side panels fully deployed and the remaining side panel partially deployed. In this stage of deployment, the first side panel 12, the second side panel 14, and the fourth side panel 18 have all fully deployed, and the third side panel 16 has rotated approximately 90 degrees about the third side hinge axis 30.

Figure 18:
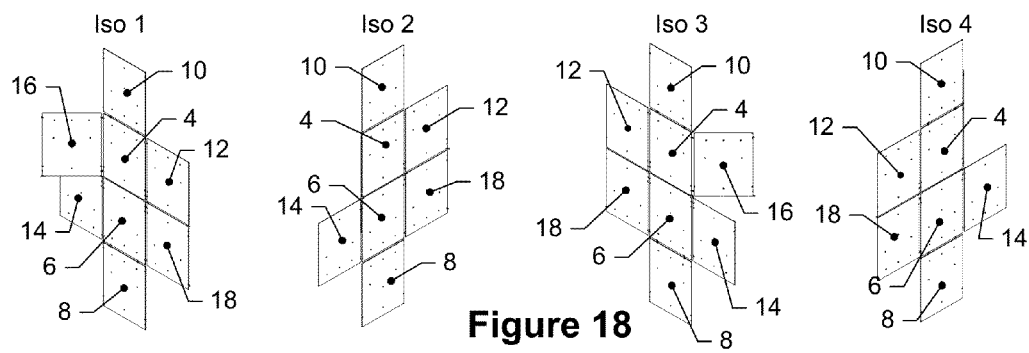

FIG. 18 depicts the solar panel array with the in-line panels and three side panels fully deployed and the remaining side panel partially deployed. In this stage of deployment, the first side panel 12, the second side panel 14, and the fourth side panel 18 have all fully deployed, and the third side panel 16 has rotated approximately 135 degrees about the third side hinge axis 30.

Figure 19:
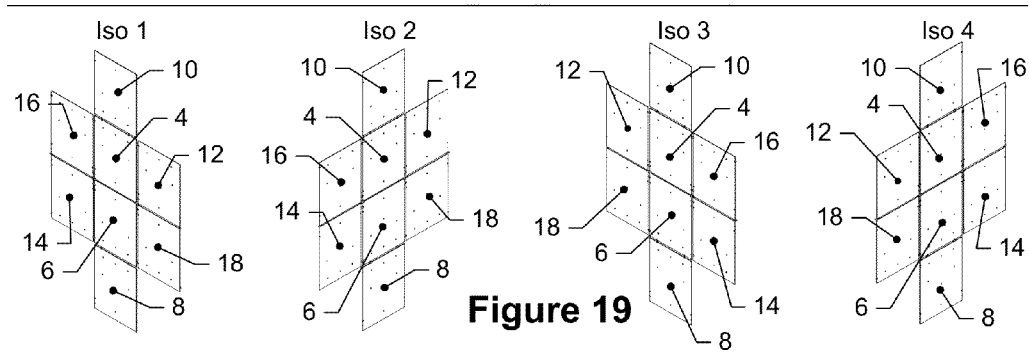

FIG. 19 depicts the solar panel array with the in-line panels and the side panels fully deployed.

The above-discussed Figures provide a large amount of detail, but omit various elements that may be part of a solar panel deployment apparatus in the interest of not overly obscuring aspects of the disclosure relating to the side panel sequencing mechanism. For example, elements such as bearings, torsion spring or other drive mechanisms, and rotational damper mechanisms for the hinge interfaces, as well as various mounting screws, are not depicted, although such elements may be included in a solar panel deployment apparatus as discussed above. Another aspect that is not discussed above but that may be part of a solar panel deployment apparatus is a boom that may be used to connect the solar panel array to the spacecraft and that may be configured to space the solar panel array off of the spacecraft some distance (to avoid shadowing of the panels by the spacecraft) and to provide for rotational adjustment of the solar panel arrays to as to maximize power generation. Such elements may also be included in a solar panel deployment apparatus as discussed above.

The materials used to manufacture the various mechanism components discussed above may be selected from materials generally used for spacecraft mounting and actuation hardware, e.g., metals such as aluminum, titanium, steel, etc.

Although several implementations of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

We claim:

1. A deployment apparatus for a multi-paneled solar array comprising:
    first and second in-line panels pivotally connected together about a first in-line hinge axis for rotation between stowed and deployed positions;
    a first side panel pivotally connected to the first in-line panel about a first side hinge axis transverse to the first in-line hinge axis for rotation between the stowed and the deployed positions;
    a second side panel pivotally connected to the second in-line panel about a second side hinge axis transverse to the first in-line hinge axis for rotation between the stowed and the deployed positions, the second side hinge axis located opposite the first side hinge axis with respect to the first and second in-line panels;
    a first drive mechanism configured to passively move the first and second in-line panels from the stowed position to the deployed position;
    a first restraint mechanism configured to substantially restrain the second side panel with respect to the second in-line panel and to release the second side panel after the first drive mechanism has begun to move the first and second in-line panels into the deployed positions;
    a second drive mechanism configured to passively rotate the second side panel about the second side hinge axis, and
    a second restraint mechanism configured to substantially restrain the first side panel with respect to the first in-line panel and to release the first side panel for rotation about the first side hinge axis after the second side panel has rotated clear of the swept extended volume of the first side panel, wherein the second restraint mechanism is further configured to not restrain the first side panel with respect to the first in-line panel when the in-line panels are in the stowed position and to enter into a configuration that restrains the first side panel with respect to the first in-line panel while the first in-line panel and the second in-line panel are transitioning from the stowed position to the deployed position.

2. The deployment apparatus of claim 1, further comprising:
    a third side panel pivotally connected to the first in-line panel about a third side hinge axis transverse to the first in-line hinge axis for rotation between the stowed and the deployed positions, the third side hinge axis located opposite the first side hinge axis with respect to the first in-line panel;
    a fourth side panel pivotally connected to the second in-line panel about a fourth side hinge axis transverse to the first in-line hinge axis for rotation between the stowed and the deployed positions, the fourth side hinge axis located opposite the second side hinge axis with respect to the second in-line panel;
    a third restraint mechanism configured to substantially restrain the third side panel with respect to the first in-line panel and to release the third side panel for rotation about the third side hinge axis after the first side panel has fully deployed; and
    a fourth restraint mechanism configured to substantially restrain the fourth side panel with respect to the second in-line panel and to release the fourth side panel for rotation about the fourth side hinge axis after the third side panel has rotated clear of the swept extended volume of the fourth side panel.

3. The deployment apparatus of claim 1, further comprising:
    a third in-line panel pivotally connected to the second in-line panel about a second in-line hinge axis parallel to and opposite the first in-line hinge axis for rotation between the stowed and the deployed positions; and
    a fourth in-line panel pivotally connected to the first in-line panel about a third in-line hinge axis parallel to and opposite the first in-line hinge axis for rotation between the stowed and the deployed positions, wherein the first drive mechanism is further configured to passively move the third and fourth in-line panels from the stowed position to the deployed position.

4. The deployment apparatus of claim 1, wherein the second restraint mechanism includes:
    a restraint surface, the restraint surface fixed in space with respect to the second side panel; and
    a roller, the roller translationally fixed in space with respect to the first side panel, wherein the roller and the restraint surface are positioned such that when the first in-line panel and the second in-line panel are in the deployed position, the restraint surface overlaps the roller in a direction paralleling the second side hinge axis.

5. The deployment apparatus of claim 1, wherein the second restraint mechanism further includes a post that supports the roller, the post affixed to a support bracket affixed to the first side panel, wherein the restraint surface:
    faces one side of the post when the first in-line panel and the second in-line panel are in the stowed position, and
    faces an opposite side of the post when the first in-line panel and the second in-line panel are in the deployed position.

6. The deployment apparatus of claim 4, wherein a reference line that is orthogonal to the first in-line hinge axis and that passes through the roller intersects the restraint surface when the first in-line panel and the second in-line panel are in the stowed position as well as when the first in-line panel and the second in-line panel are in the deployed position.

7. The deployment apparatus of claim 6, wherein the roller is located closer to the first in-line hinge axis than the restraint surface when the first in-line panel and the second in-line panel are in the stowed position.

8. The deployment apparatus of claim 4, wherein rotational relative positioning of the restraint surface with respect to the second side panel about the revolute axis is adjustable via an adjustment screw.

9. The deployment apparatus of claim 4, wherein the restraint surface is defined by a partial surface of revolution about a revolute axis substantially coaxial with the second side hinge axis.

10. The deployment apparatus of claim 9, wherein the partial surface of revolution has a revolution angle corresponding to the amount of rotation about the second side hinge axis that the second side panel must undergo to be clear of the swept extended volume of the first side panel.

11. The deployment apparatus of claim 1, wherein the first restraint mechanism is part of a first in-line hinge interface, the first in-line hinge interface including:
 a base portion;
 a bracket portion, the bracket portion including a cam surface about the first in-line hinge axis, wherein the base portion and the bracket portion are configured to rotate with respect to each other about the first in-line hinge axis between a closed position and an open position;
 a cam follower, the cam follower pivotally mounted to the base portion and sprung so as to be forced into rolling or sliding contact with the cam surface when the bracket portion and the base portion are in the closed position and while the bracket portion and the base portion are transitioned from the closed position to the open position, wherein the cam surface terminates in a locking recess that is configured to receive the cam follower when the bracket portion and the base portion are transitioned into the open position, thereby preventing further rotational movement of the bracket portion and the base portion with respect to each other.

12. The deployment apparatus of claim 11, wherein locking recess is located approximately 180 degrees about the in-line hinge axis from the cam follower when the bracket portion and the base portion are in the closed position.

13. The deployment apparatus of claim 11, wherein the first in-line hinge interface further includes a bias mechanism configured to rotate the bracket portion and the base portion into the open position.

14. A deployment apparatus for a multi-paneled solar array comprising:
 first and second in-line panels pivotally connected together about a first in-line hinge axis for rotation between stowed and deployed positions;
 a first side panel pivotally connected to the first in-line panel about a first side hinge axis transverse to the first in-line hinge axis for rotation between the stowed and the deployed positions;
 a second side panel pivotally connected to the second in-line panel about a second side hinge axis transverse to the first in-line hinge axis for rotation between the stowed and the deployed positions, the second side hinge axis located opposite the first side hinge axis with respect to the first and second in-line panels; wherein:
 the first in-line panel, the second in-line panel, the first side panel, and the second side panel are all substantially the same size,
 in the stowed position, the first in-line panel, the second in-line panel, the first side panel, and the second side panel are in an interleaved, stacked arrangement,
 in the deployed position:
  (i) the first in-line panel, the second in-line panel, the first side panel, and the second side panel are all substantially co-planar with each other,
  (ii) the first in-line panel and the second in-line panel are separated by a first gap, the first in-line panel and the first side panel are separated by a second gap, and the second in-line panel and the second side panel are separated by a third gap, and
  (iii) the first gap, the second gap, and the third gap are all substantially the same size, and
 the deployment apparatus is configured to:
  (a) release the first side panel after the first in-line panel and the second in-line panel are in the deployed position,
  (b) release the second side panel after the first in-line panel and the second in-line panel are in the deployed position, and
  (c) release the first side panel and the second side panel in a staggered fashion, wherein the side panel of the first side panel and the second side panel that is released second is released only after the side panel that is released first has cleared a stay-out zone of the side panel that is released second, the stay-out zone defined with respect to the rotation of the side panel that is released second.

15. The deployment apparatus of claim 14, wherein the first gap, the second gap, and the third gap are sized such that stay-out zones of the first side panel and the second side panel intersect when the first in-line panel and the second in-line panel are at approximately 2 degrees of misalignment from their relative positions in the deployed position, the stay-out zones of the first side panel and the second side panel defined with respect to the rotations of the first side panel and the second side panel, respectively.

16. The deployment apparatus of claim 14, further comprising:
 a third side panel pivotally connected to the first in-line panel about a third side hinge axis opposite the first side hinge axis and transverse to the first in-line hinge axis for rotation between the stowed and the deployed positions;
 a fourth side panel pivotally connected to the second in-line panel about a fourth side hinge axis opposite the second side hinge axis and transverse to the first in-line hinge axis for rotation between the stowed and the deployed positions, wherein:
 the first in-line panel, the second in-line panel, the first side panel, the second side panel, the third side panel, and the fourth side panel are all substantially the same size,
 in the stowed position, the first in-line panel, the second in-line panel, the first side panel, the second side panel, the third side panel, and the fourth side panel are in an interleaved, stacked arrangement, and
 in the deployed position:
 the first in-line panel, the second in-line panel, the first side panel, the second side panel, the third side panel, and the fourth side panel are all substantially co-planar with each other,
 the first in-line panel and the third side panel are separated by a fourth gap, and the second in-line panel and the fourth side panel are separated by a fifth gap, and
 the first gap, the second gap, the third gap, the fourth gap, and the fifth gap are all substantially the same size.

17. The deployment apparatus of claim 16, wherein the deployment apparatus is configured to:
  release the third side panel after the first side panel is in the deployed position,
  release the fourth side panel after the second side panel is in the deployed position, and
  release the third side panel and the fourth side panel in a staggered fashion, wherein the side panel of the third side panel and the fourth side panel that is released second is released only after the side panel of the third side panel and the fourth side panel that is released first has cleared an additional stay-out zone of the side panel that is released second of the third side panel and the fourth side panel, the additional stay-out zone defined with respect to the rotation of the side panel of the third side panel and the fourth side panel that is released second.

18. The deployment apparatus of claim 14, further comprising:
  a third in-line panel pivotally connected to the second in-line panel about a second in-line hinge axis parallel to and opposite the first in-line hinge axis for rotation between the stowed and the deployed positions; and
  a fourth in-line panel pivotally connected to the first in-line panel about a third in-line hinge axis parallel to and opposite the first in-line hinge axis for rotation between the stowed and the deployed positions, wherein:
  the first in-line panel, the second in-line panel, the third in-line panel, the fourth in-line panel, the first side panel, the second side panel, the third side panel, and the fourth side panel are all substantially the same size,
  in the stowed position, the first in-line panel, the second in-line panel, the third in-line panel, the fourth in-line panel, the first side panel, the second side panel, the third side panel, and the fourth side panel are in an interleaved, stacked arrangement, and
  in the deployed position:
  the first in-line panel, the second in-line panel, the third in-line panel, the fourth in-line panel, the first side panel, the second side panel, the third side panel, and the fourth side panel are all substantially co-planar with each other,
  the first in-line panel and the third side panel are separated by a fourth gap,
  the second in-line panel and the fourth side panel are separated by a fifth gap,
  the first in-line panel and the fourth in-line panel are separated by a sixth gap,
  the second in-line panel and the third in-line panel are separated by a seventh gap, and
  the first gap, the second gap, the third gap, the fourth gap, the fifth gap, the sixth gap, and the seventh gap are all substantially the same size.

* * * * *